United States Patent
Viteri et al.

(10) Patent No.: US 7,043,920 B2
(45) Date of Patent: *May 16, 2006

(54) HYDROCARBON COMBUSTION POWER GENERATION SYSTEM WITH CO2 SEQUESTRATION

(75) Inventors: Fermin Viteri, Sacramento, CA (US); James P. Taylor, Fair Oaks, CA (US); Harry Brandt, El Macero, CA (US); Roger E. Anderson, Gold River, CA (US)

(73) Assignee: Clean Energy Systems, Inc., Rancho Cordova, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 10/616,480

(22) Filed: Jul. 8, 2003

(65) Prior Publication Data

US 2004/0003592 A1     Jan. 8, 2004

Related U.S. Application Data

(63) Continuation of application No. 10/153,080, filed on May 21, 2002, now Pat. No. 6,598,398, which is a continuation of application No. 09/746,289, filed on Dec. 20, 2000, now Pat. No. 6,389,814, which is a continuation of application No. 09/023,336, filed on Feb. 13, 1998, now Pat. No. 6,170,264, which is a continuation-in-part of application No. PCT/US97/17006, filed on Sep. 22, 1997, which is a continuation-in-part of application No. 08/477,114, filed on Jun. 7, 1995, now Pat. No. 5,680,764.

(51) Int. Cl.
F01B 21/04     (2006.01)

(52) U.S. Cl. ............................ 60/716; 60/39.6; 60/683

(58) Field of Classification Search ............... 60/716, 60/39.6, 649, 678, 679, 683, 685, 710
See application file for complete search history.

(56) References Cited

U.S. PATENT DOCUMENTS 864,017 A     8/1907     Miller (Continued)

FOREIGN PATENT DOCUMENTS

DE     1301821     8/1969

(Continued)

OTHER PUBLICATIONS

Reinkenhof, J. et al.; Steam Generation with Modified H2/02—Rocket Engines; unknown date.

(Continued)

*Primary Examiner*—Hoang Nguyen
(74) *Attorney, Agent, or Firm*—Heisler & Associates

(57) ABSTRACT

A low or no pollution engine is provided for delivering power for vehicles or other power applications. The engine has an air inlet which collects air from a surrounding environment. At least a portion of the nitrogen in the air is removed. The remaining gas is primarily oxygen, which is then routed to a gas generator. The gas generator has inputs for the oxygen and a hydrocarbon fuel. The fuel and oxygen are combusted within the gas generator, forming water and carbon dioxide. The combustion products are then expanded through a power generating device, such as a turbine or piston expander to deliver output power for operation of a vehicle or other power uses. The combustion products are then passed through a condenser where the steam is condensed and the carbon dioxide is collected or discharged. A portion of the water is routed back to the gas generator. The carbon dioxide is compressed and delivered to a terrestrial formation from which return of the CO2 into the atmosphere is inhibited.

72 Claims, 17 Drawing Sheets

U.S. PATENT DOCUMENTS

| | | |
|---|---|---|
| 886,274 A | 4/1908 | Tate |
| 1,013,907 A | 1/1912 | Taylor |
| 1,227,275 A | 5/1917 | Kraus |
| 1,372,121 A | 3/1921 | Davis |
| 1,820,755 A | 8/1931 | McMullen |
| 1,828,784 A | 10/1931 | Perrin |
| 2,004,317 A | 6/1935 | Forster |
| 2,033,010 A | 3/1936 | Russell |
| 2,078,956 A | 5/1937 | Lysholm |
| 2,168,313 A | 8/1939 | Bichowsky |
| 2,218,281 A | 10/1940 | Ridder |
| 2,359,108 A | 9/1944 | Hoskins |
| 2,368,827 A | 2/1945 | Hanson |
| 2,374,710 A | 5/1945 | Smith |
| 2,417,835 A | 3/1947 | Moore |
| 2,428,136 A | 9/1947 | Barr |
| 2,469,238 A | 5/1949 | Newton |
| 2,476,031 A | 7/1949 | Farkas |
| 2,478,682 A | 8/1949 | Blackwood |
| 2,487,435 A | 11/1949 | Goddard |
| 2,523,656 A | 9/1950 | Goddard |
| 2,547,093 A | 4/1951 | Ray |
| 2,563,028 A | 8/1951 | Goddard |
| 2,568,787 A | 9/1951 | Bosch |
| 2,582,938 A | 1/1952 | Eastman |
| 2,605,610 A | 8/1952 | Hermitte |
| 2,621,475 A | 12/1952 | Loy |
| 2,636,345 A | 4/1953 | Zoller |
| 2,654,217 A | 10/1953 | Rettaliata |
| 2,656,677 A | 10/1953 | Peterson |
| 2,662,373 A | 12/1953 | Sherry |
| 2,678,531 A | 5/1954 | Miller |
| 2,678,532 A | 5/1954 | Miller |
| 2,697,482 A | 12/1954 | Blizard |
| 2,717,491 A | 9/1955 | Barr |
| 2,722,100 A | 11/1955 | Goddard |
| 2,763,987 A | 9/1956 | Kretschmer |
| 2,770,097 A | 11/1956 | Walker |
| 2,832,194 A | 4/1958 | Kuhner |
| 2,869,324 A | 1/1959 | Foote |
| 2,884,912 A | 5/1959 | Lewis |
| 2,916,877 A | 12/1959 | Walter |
| 2,986,882 A | 6/1961 | Pavlecka |
| 3,038,308 A | 6/1962 | Fuller |
| 3,054,257 A | 9/1962 | Schelp |
| 3,101,592 A | 8/1963 | Robertson |
| 3,134,228 A | 5/1964 | Wolansky |
| 3,183,864 A | 5/1965 | Stengel |
| 3,238,719 A | 3/1966 | Harslem |
| 3,298,176 A | 1/1967 | Forsyth |
| 3,302,596 A | 2/1967 | Zinn |
| 3,315,467 A | 4/1967 | DeWitt |
| 3,331,671 A | 7/1967 | Goodwin |
| 3,335,565 A | 8/1967 | Aguet |
| 3,359,723 A | 12/1967 | Bohensky |
| 3,385,381 A | 5/1968 | Calaman |
| 3,423,028 A | 1/1969 | Stupakis |
| 3,459,953 A | 8/1969 | Hughes |
| 3,559,402 A | 2/1971 | Stone |
| 3,574,507 A | 4/1971 | Kydd |
| 3,608,529 A | 9/1971 | Smith |
| 3,649,469 A | 3/1972 | MacBeth |
| 3,657,879 A | 4/1972 | Ewbank |
| 3,677,239 A | 7/1972 | Elkins |
| 3,693,347 A | 9/1972 | Kydd |
| 3,702,110 A | 11/1972 | Hoffman |
| 3,703,807 A | 11/1972 | Rice |
| 3,731,485 A | 5/1973 | Rudolph |
| 3,736,745 A | 6/1973 | Karig |
| 3,738,792 A | 6/1973 | Feng |
| 3,747,336 A | 7/1973 | Dibelius |
| 3,751,906 A | 8/1973 | Leas |
| 3,772,881 A | 11/1973 | Lange |
| 3,779,212 A | 12/1973 | Wagner |
| 3,792,690 A | 2/1974 | Cooper |
| 3,804,579 A | 4/1974 | Wilhelm |
| 3,807,373 A | 4/1974 | Chen |
| 3,826,080 A | 7/1974 | DeCorso |
| 3,831,373 A | 8/1974 | Flynt |
| 3,850,569 A | 11/1974 | Alquist |
| 3,854,283 A | 12/1974 | Stirling |
| 3,862,624 A | 1/1975 | Underwood |
| 3,862,819 A | 1/1975 | Wentworth |
| 3,928,961 A | 12/1975 | Pfefferle |
| 3,972,180 A | 8/1976 | Van Gelder |
| 3,978,661 A | 9/1976 | Cheng |
| 3,980,064 A | 9/1976 | Ariga |
| 3,982,878 A | 9/1976 | Yamane |
| 4,063,414 A | 12/1977 | Sata |
| 4,118,925 A | 10/1978 | Sperry |
| 4,133,171 A | 1/1979 | Earnest |
| 4,148,185 A | 4/1979 | Somers |
| 4,193,259 A | 3/1980 | Muenger |
| 4,194,890 A | 3/1980 | McCombs |
| 4,199,327 A | 4/1980 | Hempill |
| 4,224,299 A | 9/1980 | Barber |
| 4,224,991 A | 9/1980 | Sowa |
| 4,249,371 A | 2/1981 | Romeyke |
| 4,271,664 A | 6/1981 | Earnest |
| 4,273,743 A | 6/1981 | Barber |
| 4,297,841 A | 11/1981 | Cheng |
| 4,313,300 A | 2/1982 | Wilkes |
| 4,327,547 A | 5/1982 | Hughes |
| 4,377,067 A | 3/1983 | Sternfeld |
| 4,425,755 A | 1/1984 | Hughes |
| 4,426,842 A | 1/1984 | Collet |
| 4,434,613 A | 3/1984 | Stahl |
| 4,456,069 A | 6/1984 | Vigneri |
| 4,465,023 A | 8/1984 | Wagner |
| 4,498,289 A | 2/1985 | Osgerby |
| 4,499,721 A | 2/1985 | Cheng |
| 4,509,324 A | 4/1985 | Urbach |
| 4,519,769 A | 5/1985 | Tanaka |
| 4,528,811 A | 7/1985 | Stahl |
| 4,533,314 A | 8/1985 | Herberling |
| 4,549,397 A | 10/1985 | Cheng |
| 4,622,007 A | 11/1986 | Gitman |
| 4,631,914 A | 12/1986 | Hines |
| 4,657,009 A | 4/1987 | Zen |
| 4,674,463 A | 6/1987 | Duckworth |
| 4,680,927 A | 7/1987 | Cheng |
| 4,716,737 A | 1/1988 | Mandrin |
| 4,731,989 A | 3/1988 | Furuya |
| 4,765,143 A | 8/1988 | Crawford |
| 4,825,650 A | 5/1989 | Hosford |
| 4,841,721 A | 6/1989 | Patton |
| 4,845,940 A | 7/1989 | Beer |
| 4,884,529 A | 12/1989 | Byrnes |
| 4,899,537 A | 2/1990 | Cheng |
| 4,910,008 A | 3/1990 | Prudhon |
| 4,916,904 A | 4/1990 | Ramsaier |
| 4,928,478 A | 5/1990 | Maslak |
| 4,942,734 A | 7/1990 | Markbreiter |
| 4,948,055 A | 8/1990 | Belcher |
| 4,982,568 A | 1/1991 | Kalina |
| 4,987,735 A | 1/1991 | DeLong |
| 5,050,375 A | 9/1991 | Dickinson |
| 5,055,030 A | 10/1991 | Schirmer |
| 5,069,031 A | 12/1991 | Shekleton |
| 5,088,450 A | 2/1992 | Sternfeld |
| 5,103,630 A | 4/1992 | Correa |
| 5,131,225 A | 7/1992 | Roettger |
| 5,175,994 A | 1/1993 | Fox |
| 5,175,995 A | 1/1993 | Pak |

| | | |
|---|---|---|
| 5,247,791 A | 9/1993 | Pak |
| 5,265,410 A | 11/1993 | Hisatome |
| 5,285,628 A | 2/1994 | Korenberg |
| 5,304,356 A | 4/1994 | Iijima |
| 5,329,758 A | 7/1994 | Urbach |
| 5,353,589 A | 10/1994 | Althaus |
| 5,363,642 A | 11/1994 | Frutschi |
| 5,364,611 A | 11/1994 | Iijima |
| 5,417,053 A | 5/1995 | Uji |
| 5,449,568 A | 9/1995 | Micheli |
| RE35,061 E | 10/1995 | Correa |
| 5,473,899 A | 12/1995 | Viteri |
| 5,479,781 A | 1/1996 | Fric |
| 5,490,377 A | 2/1996 | Janes |
| 5,491,969 A | 2/1996 | Cohn |
| 5,511,971 A | 4/1996 | Benz |
| 5,535,584 A | 7/1996 | Janes |
| 5,541,014 A | 7/1996 | Micheli |
| 5,557,936 A | 9/1996 | Drnevich |
| 5,572,861 A | 11/1996 | Shao |
| 5,581,997 A | 12/1996 | Janes |
| 5,590,518 A | 1/1997 | Janes |
| 5,590,528 A | 1/1997 | Viteri |
| 5,617,719 A | 4/1997 | Ginter |
| 5,628,184 A | 5/1997 | Santos |
| 5,636,980 A | 6/1997 | Young |
| 5,678,408 A | 10/1997 | Janes |
| 5,679,134 A | 10/1997 | Brugerolle |
| 5,680,764 A * | 10/1997 | Viteri ........................... 60/716 |
| 5,687,560 A | 11/1997 | Janes |
| 5,709,077 A | 1/1998 | Beichel |
| 5,715,673 A | 2/1998 | Beichel |
| 6,170,264 B1 * | 1/2001 | Viteri et al. ................... 60/671 |
| 6,389,814 B1 * | 5/2002 | Viteri et al. ................... 60/716 |
| 6,598,398 B1 * | 7/2003 | Viteri et al. ................... 60/716 |

FOREIGN PATENT DOCUMENTS

| | | |
|---|---|---|
| DE | 2933932 | 12/1982 |
| DE | 3122338 | 5/1983 |
| DE | 2111602 | 7/1983 |
| DE | 3512947 | 10/1986 |
| EP | 0197555 | 4/1986 |
| EP | 0413199 | 2/1991 |
| EP | 0546501 | 6/1993 |
| EP | 06318464 | 11/1994 |
| EP | 0634562 | 1/1995 |
| FR | 350612 | 1/1905 |
| GB | 6394 | 5/1898 |
| GB | 140516 | 3/1920 |
| GB | 271706 | 5/1927 |
| WO | WO 91/02886 | 3/1991 |
| WO | WO 94/10427 | 5/1994 |
| WO | WO 96/07024 | 3/1996 |
| WO | WO 97/44574 | 11/1997 |

OTHER PUBLICATIONS

Sternfeld, H.; A Hydrogen/Oxygen Steam Generator for the Peak-Load Management of Steam Power Plants; unknown date.

Brauser, S. et al.; A Proposed Hydrogen-Oxygen Power Cycle; 1967; Stillwater, Oklahoma.

Reese, R. et al.; A Proposed Hydrogen-Oxygen Fueled Steam Cycle for the Propulsion of Deep Submersibles; 1971; Massachusetts.

Lotker, M.; Hydrogen for the Electric Utilities—Long Range Possibilities; 1974; Hartford, Connecticut.

Lucci, A. et al.; Title Unknown (IECEC '75 Record); 1975; Canoga Park, California.

De Biasi, V.; A Look into Real Payoffs for Combined Cycle Conversions; Gas Turbine World; 1984; pp. 17, 18, 20, 22.

Pak, P. S. et al.; Closed Dual Fluid Gas Turbine Power Plant without Emission of CO2 into the Atmosphere; IFAC/IFORS/IAEE Symposium; 1989; Pergamon Press; Tokyo, Japan.

Yantovskii, E. I.; The Thermodynamics of Fuel-Fired Power Plants without Exhaust Gases; Nov. 1991; Geneva.

Yantovskii, E. I.; Computer Exergonomics of Power Plants without Exhaust Gases; Energy Convers. Mgmt.; 1992; pp. 405-412; vol. 33, No. 5-8; Pergamon Press Ltd.; Great Britain.

Bolland, O. et al.; New Concepts for Natural Gas Fired Power Plants which Simplify the Recovery of Carbon Dioxide; Energy Convers. Mgmt.; 1992; pp. 467-475; vol. 33, No. 5-8; Pergamon Press Ltd.; Great Britain.

Hendriks, C.A. et al.; Carbon Dioxide Recovery Using a Dual Gas Turbine IGCC Plant; Energy Convers. Mgmt.; 1992; pp. 387-396; vol. 33, No. 5-8; Pergamon Press Ltd.; Great Britain.

Mercea, P. V. et al.; Oxygen Separation from Air by a Combined Pressure Swing Adsorption and Continuous Membrane Column Process; Journal of Membrane Science; 1994; pp. 131-144; Cincinnati, Ohio.

Bolland, O. et al.; Comparative Evaluation of Combined Cycles and Gas Turbine Systems with Water Injection, Steam Injection, and Recuperation; Transactions of the ASME; Jan. 1995; pp. 138-140, 142-145; vol. 117.

The NOx Report; Feb. 20, 1995; vol. 1, No. 1.

Alkam, M. K. et al.; Methanol and Hydrogen Oxidation Kinetics in Water at Supercritical States; 1995; The University of Iowa; Iowa City, Iowa.

Rice, I. G.; Steam-Injected Gas Turbine Analysis: Steam Rates; Journal of Engineering for Gas Turbines and Power; Apr. 1995; pp. 347-353; vol. 117.

Yantovskii, E. I.; A Zero Emission Combustion Power Plant for Enhanced Oil Recovery; Energy; 1995; vol. 20, No. 8; pp. 823-828.

Kolp, D. A. et al.; Advantages of Air Conditioning and Supercharging an LM6000 Gas Turbine Inlet; Journal of Engineering for Gas Turbines and Power; Jul. 1995; vol. 117.

EPA Proposes Across-the-Board Phase II NOx Limitations; Air Pollution Regulatory Analysis Service; Jan. 19, 1996; Article No. 96-2.

Agazzani, A. et al.; An Assessment of the Performance of Closed Cycles with and without Heat Rejection at Cryogenic Temperatures; International Gas Turbine and Aeroengine Congress & Exhibition; Jun. 10-13, 1996; Birmingham, UK.

Facchini, B. et al.; Semi-Closed Gas Turbine/Combined Cycle with Water Recovery and Extensive Exhaust Gas Recirculation; International Gas Turbine and Aeroengine Congress & Exhibition; Jun. 10-13, 1996; Birmingham UK.

Nakhamkin, M. et al.; The Cascaded Humidified Advanced Turbine (CHAT); Journal of Engineering for Gas Turbines and Power; Jul. 1996; pp. 565-571; vol. 118.

Rice, I. G.; Split Stream Boilers for High-Temperature/High-Pressure Topping Steam Turbine Combined Cycles; Journal of Engineering for Gas Turbines and Power; Apr. 1997; pp. 385-394; vol. 119.

Ulizar, I. et al.; A Semiclosed-Cycle Gas Turbine with Carbon Dioxide-Argon as Working Fluid; Journal of Engineering for Gas Turbines and Power; Jul. 1997; pp. 612-616; vol. 19.

Wilson, D. G. et al.; The Design of High-Efficiency Turbomachinery and Gas Turbines, Second Edition; 1998; pp. 146-161; Prentice Hall; Upper Saddle River, New Jersey.

* cited by examiner

Fig. 11

HYDROCARBON COMBUSTION POWER GENERATION SYSTEM WITH CO2 SEQUESTRATION

CROSS-REFERENCE TO RELATED APPLICATIONS

This application is a continuation of U.S. patent application Ser. No. 10/153,080 (filed on May 21, 2002) now U.S. Pat. No. 6,598,398 which is a continuation of U.S. patent application Ser. No. 09/746,289 filed Dec. 20, 2000 (now U.S. Pat. No. 6,389,814) which is a continuation of U.S. patent application Ser. No. 09/023,336 filed Feb. 13, 1998 (now U.S. Pat. No. 6,170,264), which is a continuation-in-part of International Application No. PCT/US97/17006 filed Sep. 22, 1997 which designates the United States for a continuation-in-part of application Ser No. 08/477,114, filed Jun. 7, 1995, now U.S. Pat. No. 5,680,764.

This application incorporates by reference the contents of U.S. Pat. No. 5,709,077.

FIELD OF THE INVENTION

This invention contains environmentally clean engine designs that emit zero or very low pollutant levels during operation. The CLEAN AIR ENGINE (CLAIRE) invention is directly applicable to both transportation type vehicles including automobiles, trucks, trains, airplanes, ships and to stationary power generation applications. The designs feature hybrid, dual cycle and single cycle engines. More specifically, this invention relates to low or no pollution generating hydrocarbon combustion based power generation systems which isolates and conditions carbon dioxide ($CO_2$) generated in the system for injection and sequestering into terrestrial formations such as underground geological formations and oceans.

BACKGROUND OF THE INVENTION

The current art in generating power for transportation purposes basically utilize the internal combustion gas or diesel engine. The current art for electric power generation utilize gas turbines and/or steam turbines. These devices burn hydrocarbon fuels with air which contains (by weight) 23.1% oxygen, 75.6% nitrogen and the remaining 1.3% in other gases. The emissions resulting from the combustion of fuels for internal combustion engines (gasoline or diesel), with air contain the following pollutants that are considered damaging to our air environment. These smog causing pollutants, are: total organic gases (TOG); reactive organic gases (ROG); carbon monoxide (CO); oxides of nitrogen ($NO_x$); oxides of sulfur ($SO_x$); and particulate matter (PM). Approximately one half of the total pollutants emitted by all sources of air pollution in California are generated by road vehicles (Emission Inventory 1991, State of California Air Resources Board, prepared January 1994). The major source of this vehicle pollution comes from passenger cars and light to medium duty trucks.

No near term solutions appear in sight to drastically reduce the vast amount of air pollutants emitted by the many millions of automobiles and trucks operating today. Based on the State of California Air Resources Board study, the average discharge per person in California of the air pollutants from mobile vehicles, monitored by this agency during 1991 and reported in 1994, was approximately 1.50 lb/day per person. With a nationwide population of over 250,000,000 people, this data extrapolates to over 180,000 tons of air borne emissions per day being discharged in the USA by mobile vehicles. Also, the number of cars and miles that are being driven continue to increase, further hampering efforts to reduce smog causing pollutants.

Allowable emission thresholds are rapidly tightening by Federal and State mandates. These allowable emission reductions are placing severe demands on the transportation industry and the electric power generating industry to develop new and lower emission power systems.

Although considerable effort is being directed at improving the range of electric zero emission vehicles (ZEV) by developing higher energy capacity, lower cost storage batteries, the emission problem is been transferred from the vehicle to the electric power generating plant, which is also being Federally mandated (Clean Air Act Amendments of 1990) to reduce the same air toxic emissions as those specified for automobiles and trucks.

The current world wide art of generating power for consumers of electricity depends primarily on fossil fuel burning engines. These engines burn hydrocarbon fuels with air. As described above, combustion of fossil fuels with air usually produce combustion products that contain a number of pollutants. Current Unites States regulatory requirements prescribe the amounts of the atmospheric pollutants permitted in particular locations. Allowable pollutant thresholds are decreasing over time and thereby putting more and more pressure on industry to find better solutions to reduce these emissions of pollutants in the electric power generating industry and other power generating industries.

Other energy sources being developed to solve the emissions problem, by exploiting non combustible energy sources include fuel cells and solar cells. Developers are solving many of the technological and economic problems of these alternate sources. However, widespread use of these energy sources for vehicles and for electric power generating facilities do not appear to yet be practical.

In addition to the emission of pollutants, combustion based power generation systems also generate significant amounts of carbon dioxide ($CO_2$). While $CO_2$ emissions are currently not regulated in the United States, concern has been voiced by experts over the release of $CO_2$ and other greenhouse gases into the environment. One method for eliminating the formation of $CO_2$ in combustion based power generation systems is to utilize hydrogen as the fuel rather than a hydrocarbon fuel. Use of hydrogen as a fuel has many drawbacks including the highly flammable and potentially explosive nature of hydrogen when in a gaseous state, the significant energy required to maintain hydrogen in a liquid state, the low density of hydrogen requiring large volumetric storage capacity and the fact that all present commercial production of hydrogen comes from fossil fuels which also yield $CO_2$ as a by-product.

Some attention has recently been given to the concept of separating the $CO_2$ from other combustion products and then disposing of the $CO_2$ by injecting it into deep porous geological formations or deep into the earth's oceans where environmental impacts of the release of the $CO_2$ would be minimized. Interest in such terrestrial formation disposal techniques is exemplified by the recent issuance by the United States Department of Energy of a Small Business Innovation Research (SBIR) program solicitation (reference number DOE/ER-0706, closing date Mar. 2, 1998) specifically seeking strategies for mitigation of greenhouse gases and pollutants including $CO_2$. This solicitation sought approaches to $CO_2$ disposal involving usage of potential storage sites such as oil and gas reservoirs, unmineable coal seams, the deep ocean, or deep confined aquifers. $CO_2$ separation and injection systems are known in the prior art but the CO2 is only partially separated and the processes are so energy intensive that such systems are not generally commercially viable. Accordingly, a need exists for such a more efficient CO2 separation and injection system which can sequester and dispose of the CO2 in an economically viable manner.

SUMMARY OF THE INVENTION

This invention provides a means for developing a zero or very low pollution vehicle (ZPV) and other transportation power systems (i.e. rail and ship), as well as a zero or low pollution electric power generating facility. The zero or very low pollution is achieved by removing the harmful pollutants from the incoming fuel and oxidizer reactants prior to mixing and burning them in a gas generator or combustion chamber. Sulfur, sulfides and nitrogen are major pollutants that must be removed from the candidate fuels: hydrogen, methane, propane, purified natural gas, and light alcohols such as ethanol and methanol. Since air contains 76% nitrogen by weight, it becomes a major source of pollution that also requires removal prior to combining it with the clean fuel.

Cleansing of the fuel is straightforward and requires no further elaboration. The separation of the oxygen from the nitrogen in the air, however, is accomplished in a variety of ways. For instance, nitrogen can be removed from air by the liquefaction of air and gradual separation of the two major constituents, oxygen and nitrogen, by means of a rectifier (to be described later in more detail). The separation of the gases relies on the two distinct boiling points for oxygen (162° R) and for nitrogen (139° R) at atmospheric pressure. Air liquefies at an intermediate temperature of (142° R).

Other nitrogen removal techniques include vapor pressure swing adsorption, and membrane based air separation. With vapor pressure swing adsorption, materials are used which are capable of adsorption and desorption of oxygen. With membrane based air separation, an air feed stream under pressure is passed over a membrane. The membrane allows one component of the air to pass more rapidly there through than other components, enriching the amount of different components on opposite sides of the membrane. Such membranes can be of a variety of different materials and use several different physical processes to achieve the desired separation of nitrogen out of the air.

One embodiment of this invention consists of a hybrid power system that combines a Rankine cycle thermal cycle with an auxiliary electric motor for start-up and chill-down requirements. The thermal power cycle of the engine begins by compressing ambient air to high pressures, cooling the air during compression and during the expansion to liquid air temperatures in a rectifier where separation of the oxygen and nitrogen takes place. The cold gaseous nitrogen generated is used to cool the incoming air and then is discharged to the atmosphere at near ambient temperature. Simultaneously, the cold gaseous or liquid oxygen generated by the rectifier is pressurized to gas generator pressure levels and delivered to the gas generator at near ambient temperature. Fuel, gaseous or liquid, from a supply tank is pressurized to the pressure level of the oxygen and also delivered to the gas generator where the two reactants are combined at substantially the stoichiometric mixture ratio to achieve complete combustion and maximum temperature hot gases (6500° R). These hot gases are then diluted with water downstream in a mixing section of the gas generator until the resulting temperature is lowered to acceptable turbine inlet temperatures (2000° R).

The drive gas generated from this mixing process consists of high purity steam, when using oxygen and hydrogen as the fuel, or a combination of high purity steam and carbon dioxide (CO2), when using oxygen and light hydrocarbon fuels (methane, propane, methanol, etc.). Following the expansion of the hot gas in the turbine, which powers the vehicle or the electric power generating plant, the steam or steam plus CO2 mixture are cooled in a condenser to near or below atmospheric pressure where the steam condenses into water, thus completing a Rankine cycle. Approximately 75% of the condensed water is recirculated to the gas generator while the remainder is used for cooling and discharged to the atmosphere as warm water vapor. When using light hydrocarbons as the fuel, the gaseous carbon dioxide remaining in the condenser is compressed to slightly above atmospheric pressure and either converted to a solid or liquid state for periodic removal, or the gas can be discharged into the atmosphere when such discharge is considered non-harmful to the local air environment.

Since this thermal cycle requires time to cool the liquefaction equipment to steady state low temperatures, an electric motor, driven by an auxiliary battery, can be used to power the vehicle and initiate the Rankine cycle until chill-down of the liquefaction equipment is achieved. When chill-down is complete the thermal Rankine engine, connected to an alternator, is used to power the vehicle or stationary power plant and recharge the auxiliary battery.

The combination of these two power systems, also referred to as a hybrid vehicle, emit zero or very low pollution in either mode of operation. In addition, the electric motor battery is charged by the zero or very low pollution thermal Rankine cycle engine itself and thus does not require a separate electric power generating plant for recharge. This reduces the power demand from central power stations and also reduces a potential source of toxic air emissions.

In place of the electric drive motor and battery, the Rankine cycle engine, with the addition of a few control valves, can also be operated as a minimally polluting open Brayton cycle, burning fuel and incoming air to power the vehicle during the period necessary to allow the Rankine cycle engine liquefaction equipment time to chill-down. This feature is another embodiment of this invention.

The zero or very low pollution Rankine cycle engine can also be used in a single cycle thermal mode for vehicles with long duration continuous duty such as heavy trucks, trains, ships and for stationary power generation plants where the chill-down time is not critical to the overall operational cycle.

The adaptation of the Otto and Diesel thermal cycles to a low-polluting hybrid engine are also included as embodiments of this invention. By using these thermal cycles, the need for a condenser and recirculating water system are eliminated. Low temperature steam or steam/carbon dioxide gases are recirculated as the working fluid and therefore replace the function of the recirculating water quench of the Rankine cycle embodiments previously discussed.

The combustion products resulting from operation of the above-described engine are substantially entirely H2O and CO2 (when a hydrocarbon fuel is used). These combustion products are in contrast to combustion products resulting from typical hydrocarbon combustion based power generation systems which do not have an air constituent separation device, as identified above. Combustion products in such prior art systems would also include a large amount of nitrogen and unused oxygen as well as NOx and various carbon containing species. Because the combustion products resulting from the above-described engine are merely H2O and CO2, the isolation and conditioning of CO2 is straight forward and draws little power away from the system as a whole.

Specifically, the combustion products are passed through a condenser where the H2O condenses into a liquid phase. Gases exiting the condenser are substantially only carbon dioxide and can be directed out of the condenser for use in a terrestrial formation injection system or other disposal, such as for use in industrial processes requiring CO2. To most effectively inject the CO2 into a deep terrestrial formation, the CO2 must be pressurized. Such formations include oceans; deep aquifers; and porous geological formations such as partially or fully depleted oil or gas formations, salt caverns, sulfur caverns and sulfur domes. To accomplish such pressurization the gaseous CO2 can be compressed in one or more stages with after cooling and condensation of additional water. The modestly pressurized CO2 can then be further dried by conventional methods such as through the use of molecular sieves and passed to a CO2 condenser where the CO2 is cooled and liquefied. The CO2 can then be efficiently pumped with minimum power to a pressure necessary to deliver the CO2 to a depth within the geological formation or the ocean depth at which CO2 injection is desired. Alternatively, the CO2 can be compressed through a series of stages and discharged as a super critical fluid at a pressure matching that necessary for injection into the geological formation or deep ocean.

OBJECTS OF THE INVENTION

Accordingly, a primary object of the present invention is to provide a low or zero pollution combustion based power generation system which additionally isolates and conditions CO2 from combustion products discharged by the system for effective handling of the CO2 in a manner other than release of the CO2 into the atmosphere.

Another object of this invention is to provide a high efficiency combustion based power generation system.

Another object of the present invention is to provide a power generation system which can also produce water as a byproduct. In areas where water is scarce the water byproducts produced by this invention are particularly beneficial.

Another object of the present invention is to provide a combustion based power generation system which includes an air treatment plant for separating nitrogen from the air prior to use of the air to combust a hydrocarbon fuel, such that nitrogen oxides and other pollutants are reduced or eliminated as byproducts of combustion in the power generation system.

Another object of the present invention is to provide a hydrocarbon combustion based power generation system which injects CO2 produced by the power generation system into a terrestrial formation such as a deep porous geological structure or an undersea location.

Another object of the present invention is to provide a combustion based power generation system which releases no combustion products into the atmosphere.

Another object of the present invention is to provide a reliable and economical source of power which does not harm the surrounding environment.

Other further objects of this invention will become apparent upon a careful reading of the included description of the invention and review of the drawings included herein, as well as the claims.

BRIEF DESCRIPTION OF THE DRAWINGS

FIG. 11 is a schematic illustrating an embodiment of this invention that features a low polluting hybrid engine with an electric motor drive and a Diesel power cycle reciprocating engine.

DESCRIPTION OF THE PREFERRED EMBODIMENT

Figure 1:
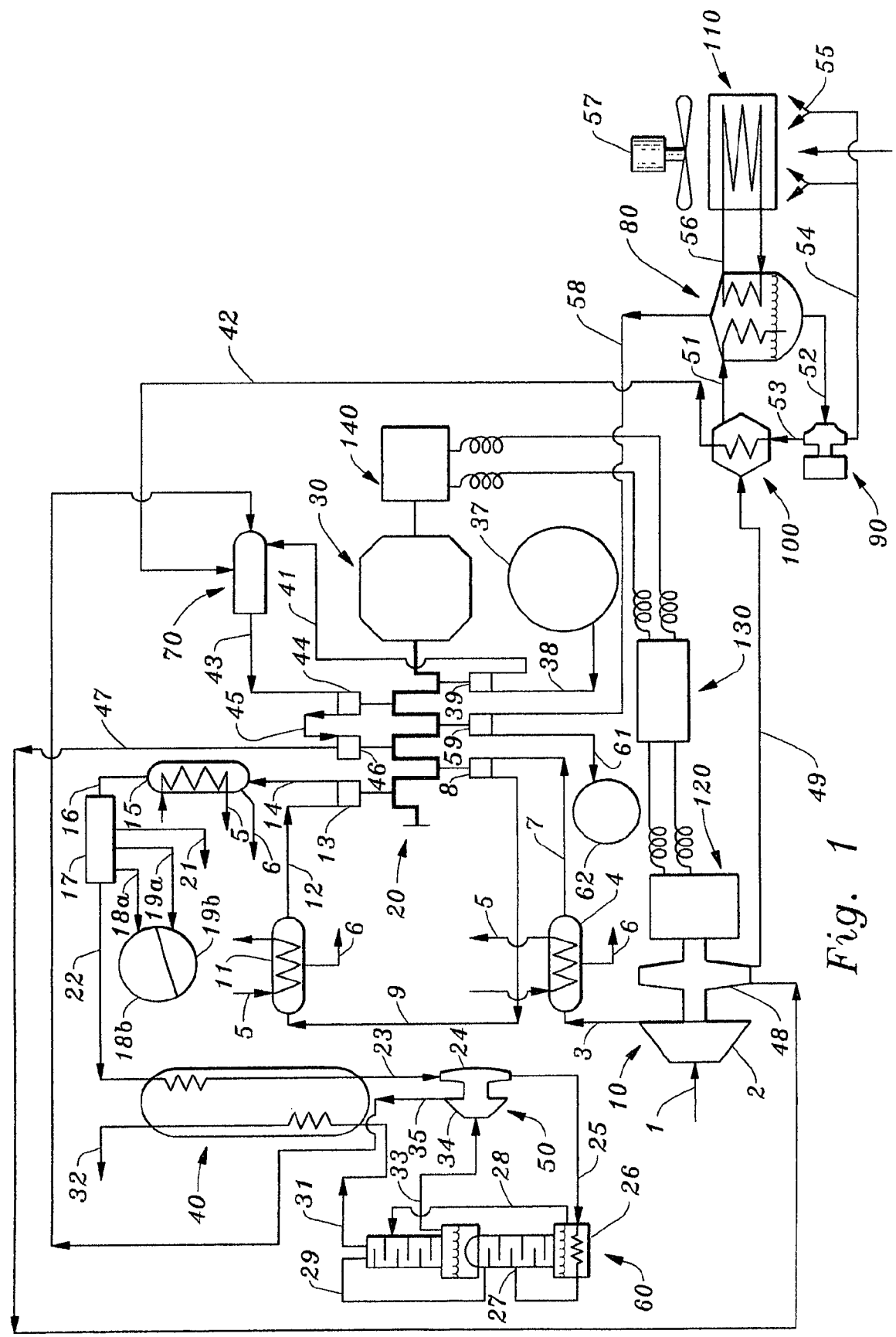
FIG. 1 is a schematic illustrating an embodiment of this invention and its elements, along with their connectivity. This embodiment constitutes a very low pollution or pollution-free hybrid power system for vehicular and other applications. The fuel reactant is a light hydrocarbon type such as methane propane, purified natural gas, and alcohols (i.e. methanol, ethanol).

According to the first embodiment of the present invention, a zero or very low pollution Rankine cycle thermal engine operating in parallel with a zero emissions electric motor (also referred to as a hybrid engine) is illustrated in FIG. 1. The Rankine engine consists of a dynamic turbocompressor 10, a reciprocating engine 20, a power transmission 30, a heat exchanger 40, a turboexpander 50, a rectifier 60, a gas generator 70, a condenser 80, a recirculating water feed pump 90, a water heater 100 and a condenser coolant radiator 110. The electric engine consists of an alternator 120, a battery 130 and electric motor 140.

Hybrid engine operation begins by starting the electric motor 140 using the battery 130 as the energy source. The electric motor 140 drives the reciprocating engine 20 through the power transmission 30 and thereby initiates the start of the thermal engine that requires a chill-down period for the liquefaction equipment consisting of heat exchanger 40, turboexpander 50 and rectifier 60.

Activation of the thermal engine initiates the compression of ambient temperature air from a surrounding environment entering the dynamic compressor 2 through an air inlet duct 1. The compressor 2 raises the air to the design discharge pressure. The air then exits through duct 3 into intercooler 4 where the heat of compression is removed by external cooling means 5 (i.e. air, water, Freon, etc.). Condensed water vapor from the air is tapped-off by drain 6. After the air exits intercooler 4 through duct 7, at a temperature equal to the compressor inlet, it enters the reciprocating compressor 8 and is raised to the design discharge pressure. The air exits through duct 9 into intercooler 11 and is again cooled to the inlet temperature of the compressor. This compression/cooling cycle is repeated as the air exits intercooler 11 through duct 12 and enters reciprocating compressor 13, then exits through duct 14, enters intercooler 15 and exits through duct 16, to complete the air pressurization.

The high pressure, ambient temperature air then enters the scrubber 17 where any gases or fluids that could freeze during the subsequent liquefaction are removed. These gases and liquids include carbon dioxide (duct 18a and storage tank 18b), oil (line 19a and storage tank 19b) and water vapor (tap off drain 21). The oil can be from a variety of sources, such as leakage from the air compression machinery. The dry air then exits through duct 22 and enters heat exchanger 40 where the air is cooled by returning low temperature gaseous nitrogen.

The dry air is now ready to pass through an air treatment device for the separation of nitrogen out of the air and to provide nitrogen free oxygen for combustion as discussed below. The dry air will contain, by weight, 23.1% oxygen, 75.6% nitrogen, 1.285% argon and small traces of hydrogen, helium, neon, krypton and xenon (total of 0.0013%). Argon has a liquefaction temperature of 157.5° R, which lies between the nitrogen and oxygen boiling points of 139.9° R and 162.4° R respectively. Therefore argon, which is not removed, will liquefy during the liquefaction process. The remaining traces of gases hydrogen, helium and neon are incondensable at temperatures above 49° R while krypton and xenon will liquefy; however, the trace amounts of these latter gases is considered insignificant to the following air liquefaction process.

The dry air then exits through duct 23 and enters the turboexpander 24 where the air temperature is further reduced to near liquid air temperature prior to exiting duct 25 and enters the rectifier 60 (a two column type design is shown). Within the rectifier, if not before, the air is cooled to below the oxygen liquefaction temperature. Preferably, a two column type rectifier 60 is utilized such as that described in detail in the work: *The Physical Principles of Gas Liquefaction and Low Temperature Rectification*, Davies, first (published by Longmans, Green and Co. 1949).

The air exits from the lower rectifier heat exchanger 26 through duct 27 at liquid air temperature and enters the rectifier's lower column plates where the oxygen/nitrogen separation is initiated. Liquid with about 40% oxygen exits through duct 28 and enters the upper rectifier column where a higher percentage oxygen concentration is generated. Liquid nitrogen at 96% purity is recirculated from the lower rectifier column to the upper column by means of duct 29. Gaseous nitrogen at 99% purity (1% argon) exits through duct 31 and enters heat exchanger 40 where cooling of the incoming air is performed prior to discharging through duct 32 to the atmosphere at near ambient temperature and pressure. Gaseous or liquid oxygen at 95% purity (5% argon) exits through duct 33 and enters the turboexpander compressor 34 where the oxygen is pressurized to the design pressure. The high pressure oxygen then exits through duct 35 and enters the gas generator 70.

A light hydrocarbon fuel (methane, propane, purified natural gas and light alcohols such as ethanol and methanol) exits the fuel supply tank 37 through duct 38 and enters the reciprocating engine cylinder 39 where the fuel is raised to the design discharge pressure. The fuel then exits through duct 41 and enters the gas generator 70 to be mixed with the incoming oxygen at the stoichiometric mixture ratio to achieve complete combustion and maximum hot gas temperature (approximately 6500° R). The gas generator includes an ignition device, such as a spark plug, to initiate combustion. While the gas generator 70 is the preferred form of fuel combustion device for this embodiment, other fuel combustion devices could also be used, such as those discussed in the alternative embodiments below. The products of combustion of these reactants result in a high purity steam and carbon dioxide gas and a small amount of gaseous argon (4%).

Following the complete combustion of the high temperature gases, recirculating water is injected into the gas generator 70 through line 42 and dilutes the high temperature gases to a lower temperature drive gas acceptable to the reciprocating engine (approximately 2000° R). This water influx also increases a mass flow rate of combustion products available for expansion and power generation. The drive gas then exits the gas generator 70 through discharge duct 43, enters reciprocating cylinder 44, expands and provides power to the power transmission 30. Other combustion product expansion devices can replace the reciprocating cylinder 44, such as the dynamic turbines discussed in the sixth embodiment below. The gas exits through duct 45, enters the second cylinder 46, expands and also provides power to the power transmission; the gas exits through duct 47 and powers the dynamic turbine 48 which drives the centrifugal compressor 2, which was driven by the electric motor 140 during start-up, and the alternator 120 to recharge the battery 130.

The gas then exits through duct 49, enters the water heater 100 where residual heat in the gas is transferred to the recirculating water being pumped by pump 90, the water heater gas exits through duct 51, enters the condenser 80 at near or below atmospheric pressure, where condensation of the steam into water and separation of the carbon dioxide takes place. The condensed water exits through line 52, enters the pump 90 where the pressure of the water is raised to the gas generator 70 supply pressure level. A major portion of the pump 90 discharge water exits through line 53, enters the water heater 100 where heat is transferred from the turbine 48 exhaust gas and then exits through line 42 for delivery to the gas generator 70. The remaining water from the discharge of pump 90 exits through duct 54 and is sprayed through nozzles 55 into radiator 110 (evaporative cooling). Coolant for the condenser gases is recirculated through duct 56 to the radiator 110 where heat is rejected to atmospheric air being pumped by fan 57.

The gaseous carbon dioxide, remaining after the condensation of the steam, exits the condenser 80 through duct 58 and enters the reciprocating cylinder 59, (when the condenser pressure is below atmospheric) compressed to slightly above atmospheric pressure and discharged through duct 61. The compressed carbon dioxide can be stored in storage tank 62 and converted to a solid or liquid state for periodic removal; or the gas can be discharged into the atmosphere when such expulsion is permitted.

It should be noted that this hybrid engine generates its own water requirements upon demand and thus eliminates the freezing problem of a steam Rankine cycle in a cold (below freezing) environment. Also, the engine generates its oxidizer requirements on demand and thus eliminates many safety concerns regarding oxygen storage.

Figure 2:
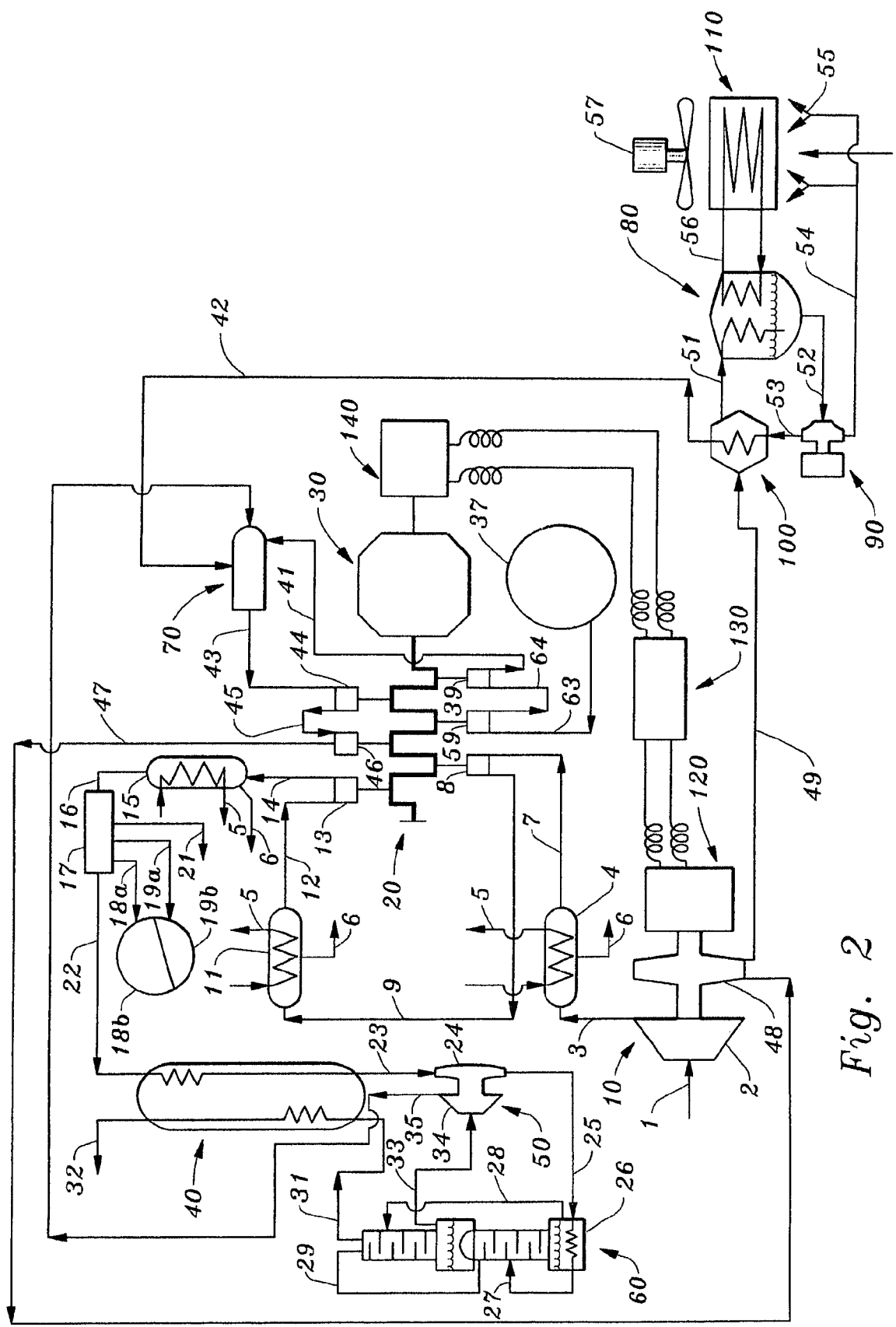
FIG. 2 is a schematic illustrating an embodiment of this invention which is also a very low pollution or pollution-free hybrid power system for vehicular and other applications where the fuel is gaseous hydrogen.

A second embodiment of this invention, illustrated in FIG. 2, features a hybrid engine when using hydrogen in place of a hydrocarbon fuel. When using hydrogen as the fuel no carbon dioxide is generated and only high purity steam exits from the gas generator 70. Consequently all systems related to carbon dioxide are deleted, and no other changes are basically required. However, to maintain the same six cylinder engine of FIG. 1, the hydrogen fuel FIG. 2 exits the fuel supply tank 37 through duct 63, enters reciprocating engine cylinder 59, exits through duct 64, enters reciprocating engine cylinder 39, exits through duct 41 and is delivered to the gas generator 70. This permits two stages of compression for the low density hydrogen.

Figure 3:
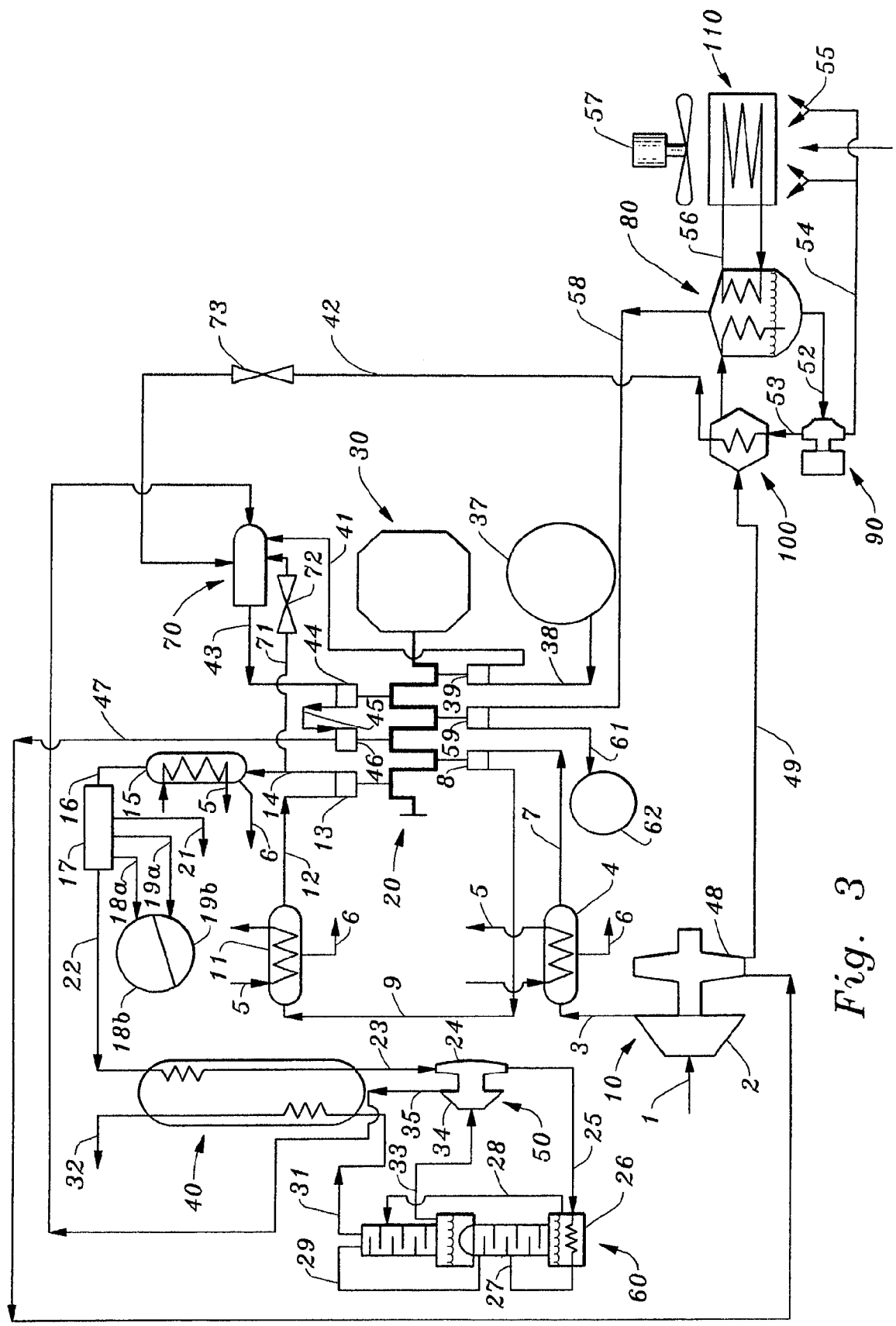
FIG. 3 is a schematic illustrating an embodiment of this invention which is a very low pollution or pollution-free power system for vehicular and other applications during cruise and continuous duty. During start-up and a short period thereafter, the engine runs in an open Brayton cycle mode and thus emits some pollutants.

A third embodiment of this invention, illustrated in FIG. 3, features a dual cycle engine where a Brayton cycle is used for start-up and chill-down of the air liquefaction equipment (Mode I) and a Rankine cycle is used for cruise, idle and continuous duty (Mode II). To incorporate this feature, high pressure air is tapped-off from cylinder 13 (air pressurization as previously described for embodiment one) by means of bypass air duct 71 and modulated by valve 72. Also, recirculating water to the gas generator is modulated by means of valve 73 to control the combustion temperature of the fuel and oxygen and the exit temperature of the gaseous mixture being delivered to power the cycle through duct 43.

Figure 5:
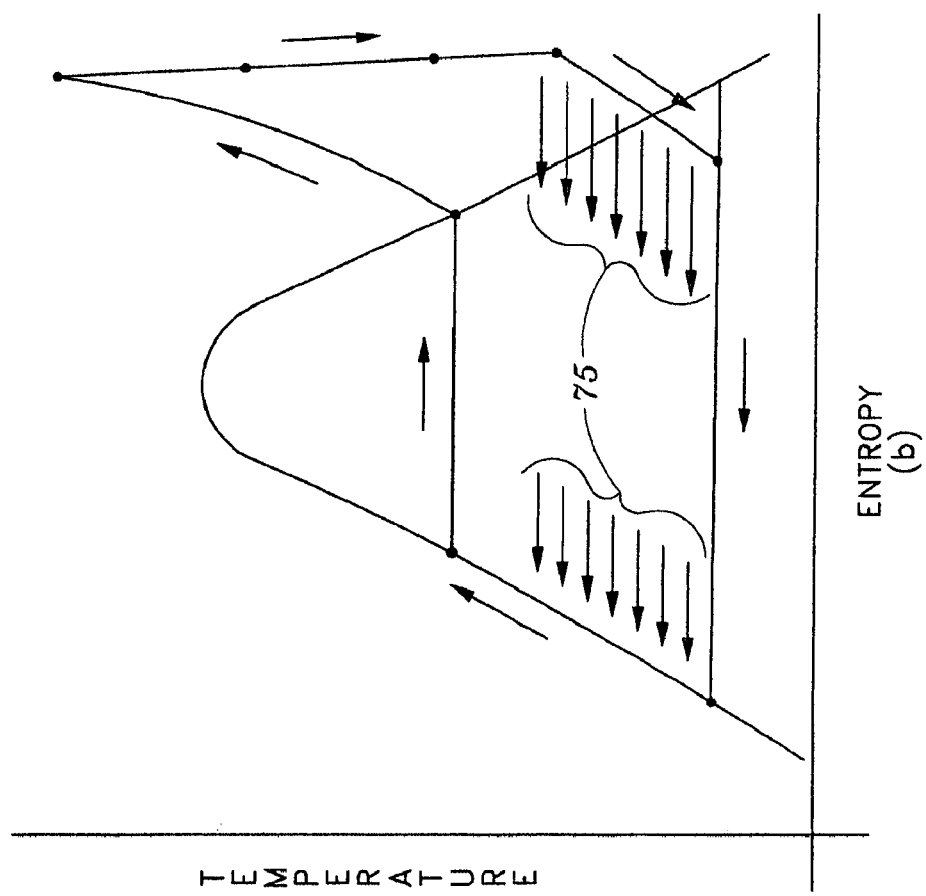
FIG. 5 is a plot of Temperature v. Entropy for the working fluid illustrating the second cycle used in the dual mode engine of FIG. 3. This cycle is a Rankine with regeneration, (Mode II).
Figure 4:
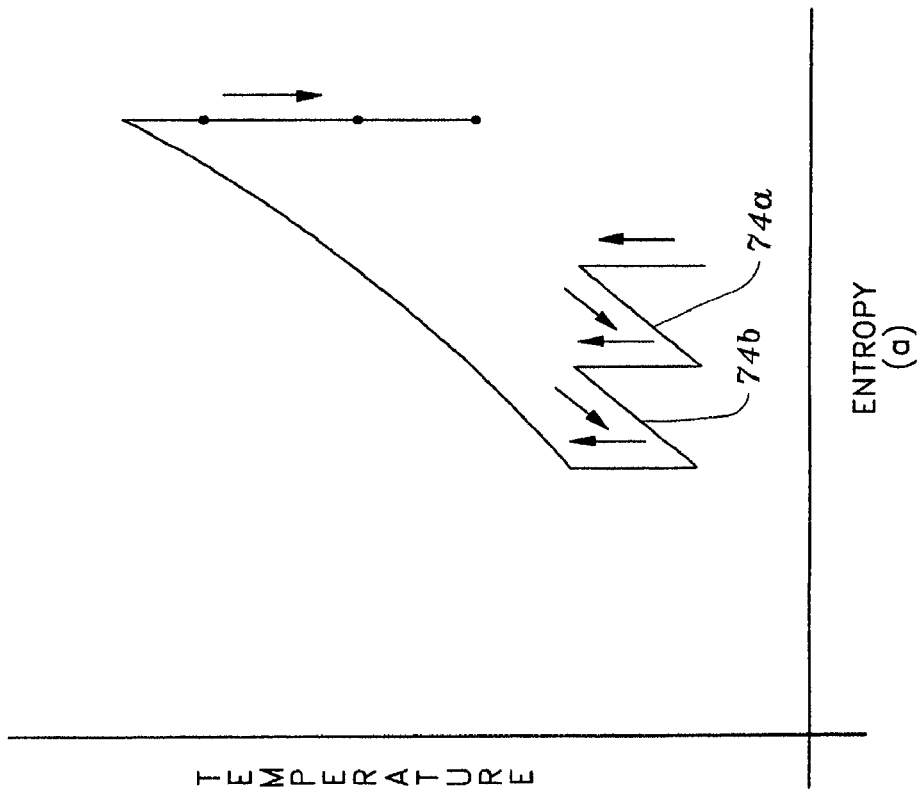
FIG. 4 is a plot of Temperature v. Entropy for the working fluid illustrating the first of two cycles used in the dual mode engine of FIG. 3. This cycle is an open Brayton with inter-cooling between compressor stages (Mode I).

The thermodynamic cycles for these two operating Modes are illustrated in FIG. 4 and FIG. 5. The working fluid for power cycle operation in Mode I consists of steam, carbon dioxide and gaseous air. When operating in Mode II the working fluid (as discussed in embodiment one and two) consists of steam and carbon dioxide when using hydrocarbon fuel and steam only when using hydrogen.

An open Brayton cycle, illustrated in FIG. 4, with two stages of intercooling the compressed air, 74a, and 74b, is used to power the engine during Mode I and initiates the chill-down of the liquefaction equipment for subsequent Mode II operation of the Rankine cycle with regeneration 75, illustrated in FIG. 5. Note that this embodiment eliminates the need for an electric motor, battery and alternator.

Figure 6:
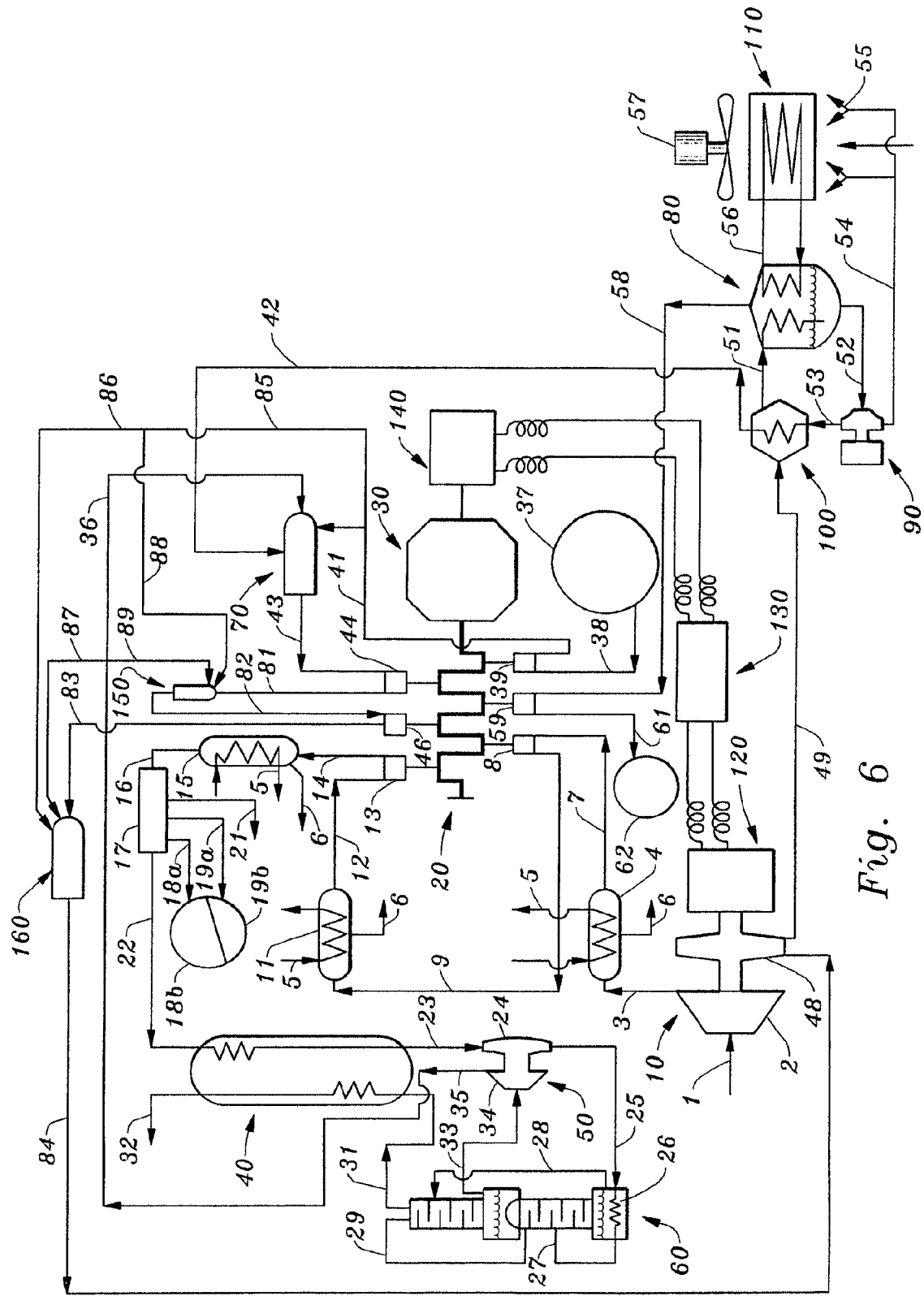
FIG. 6 is a schematic illustrating an embodiment of this invention and its interconnecting elements. This embodiment constitutes a very low pollution or pollution-free hybrid power system for vehicular and other applications similar to that of FIG. 1 but with the addition of two reheaters to the power cycle for improved performance. The fuel reactant for this cycle is a light hydrocarbon.

A fourth embodiment of this invention, illustrated in FIG. 6, includes all the elements of the first embodiment and adds two reheaters 150 and 160 to improve the performance of this engine. While two reheaters 150, 160 are shown, any number of reheaters can be utilized depending on the requirements of each specific application.

The engine operates as described for the first embodiment but with the following changes. Hot gases exiting reciprocating cylinder 44 exit through duct 81, enter the reheater 150 where additional light hydrocarbon fuel and oxygen is injected through ducts 88 and 89 respectively. The heat of combustion of these reactants within the reheater 150 raises the incoming gas temperature to the level of the gas generator 70 output. The reheated gas then exits reheater 150 through duct 82, enters reciprocating cylinder 46, expands and exits through duct 83 and enters reheater 160 where additional oxygen and fuel is injected. The heat of combustion of these reactants within the reheater 160 again raises the incoming gas temperature to the same level as at the gas generator 70 output. The heated gas then exits through duct 84 and enters the dynamic turbine 48, as described previously in the first embodiment. Fuel for the reheater 160 is supplied through duct 86. The oxygen is supplied through duct 87.

Figure 7:
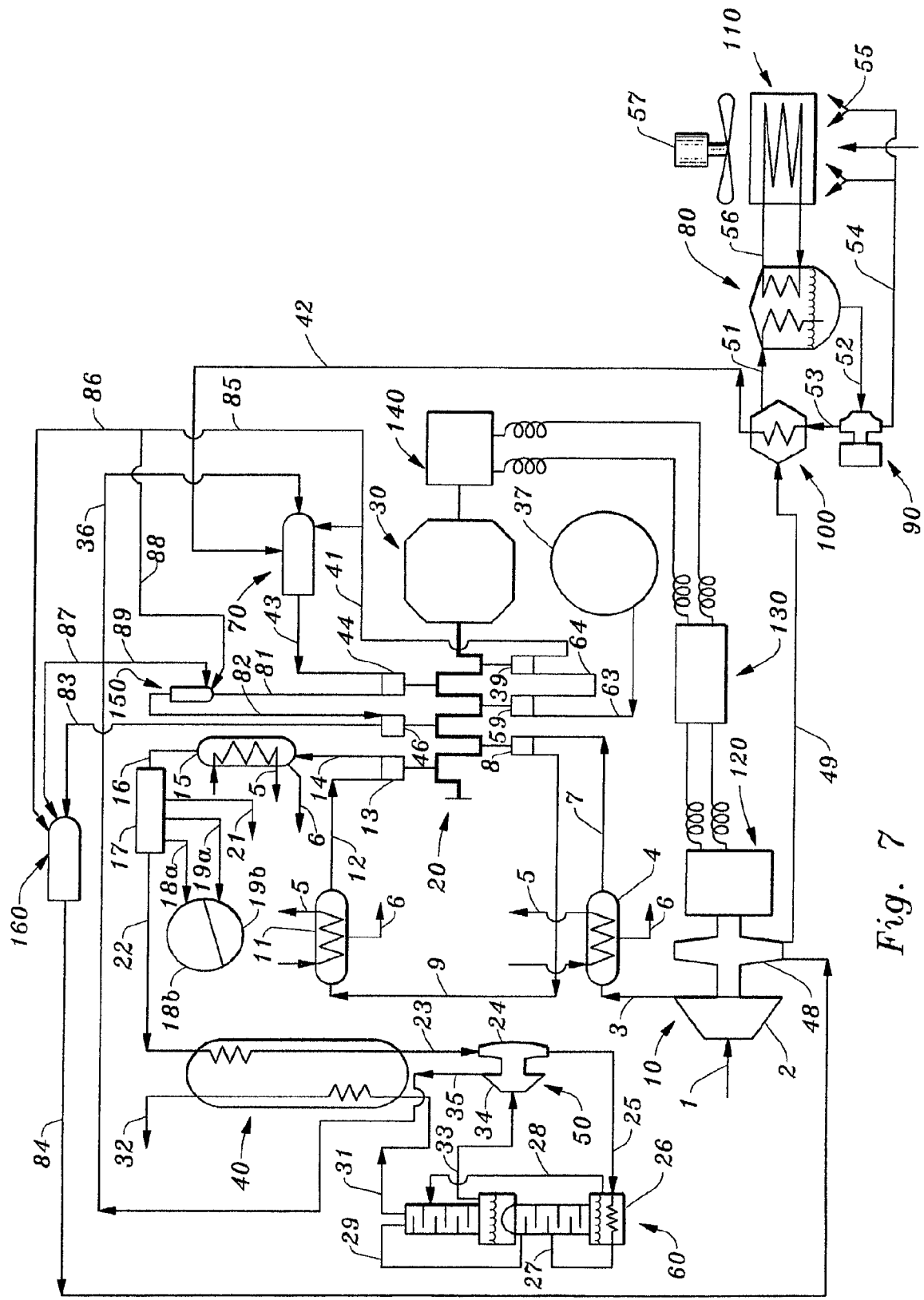
FIG. 7 is a schematic illustrating an embodiment of this invention and its interconnecting elements. This embodiment constitutes a very low pollution or pollution-free hybrid power system similar to that of FIG. 2 but with the addition of two reheaters to the power cycles for improved performance. The fuel reactant for this cycle is hydrogen.
Figure 8:
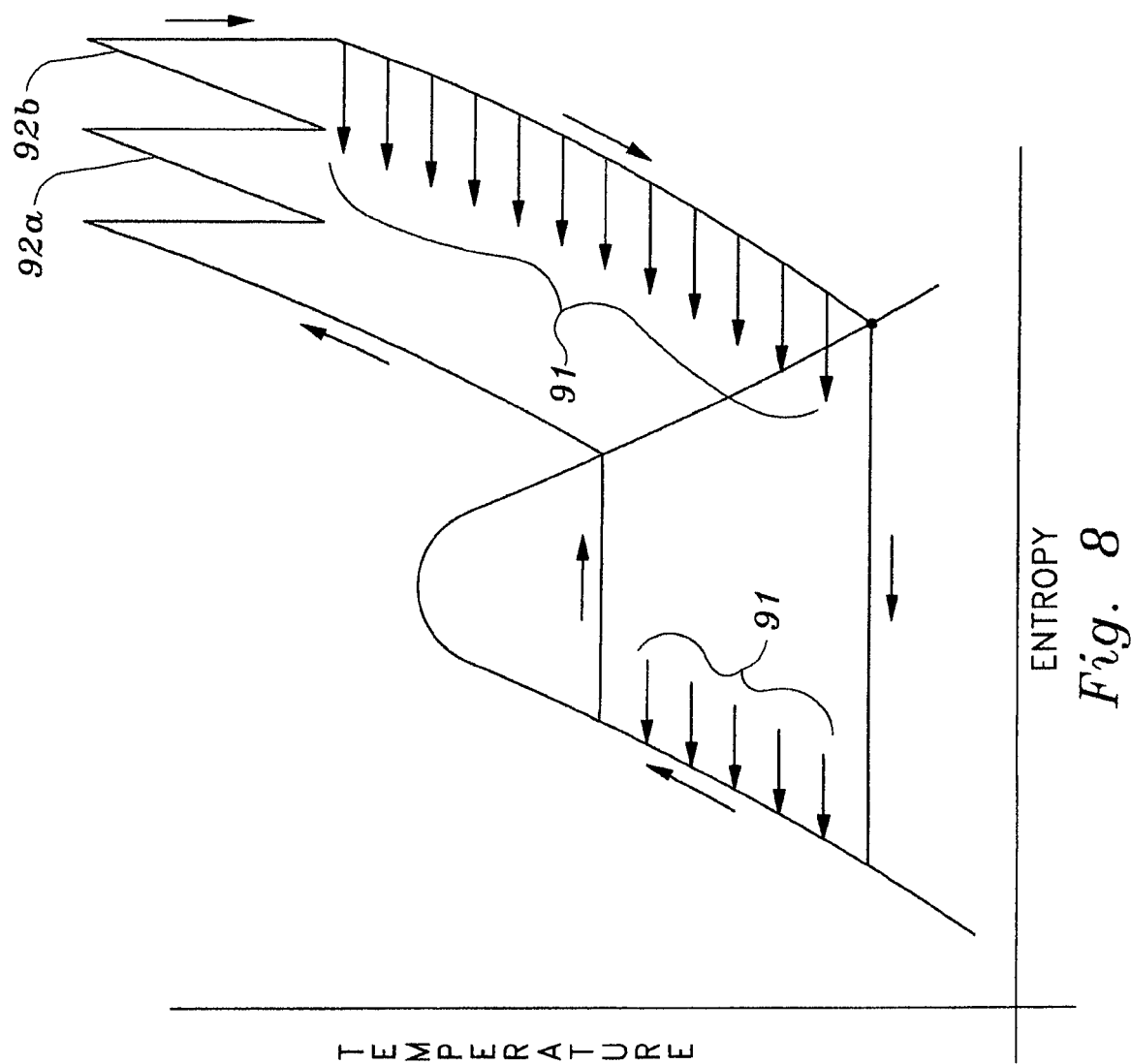
FIG. 8 is a plot of Temperature v. Entropy for the working fluid for the power cycle used for the thermal engines shown in FIG. 6 and FIG. 7. This cycle features the Rankine cycle with regeneration and reheat for improved performance.

A fifth embodiment of this invention, illustrated in FIG. 7, includes all the elements of the second embodiment and adds two reheaters 150 and 160 to improve the performance. This engine operates as described for embodiment four except this engine uses hydrogen fuel. The Rankine cycle of these embodiments using regeneration and reheats is illustrated in FIG. 8. Regeneration is illustrated by 91 and the two reheats are illustrated by 92a and 92b.

Figure 9:
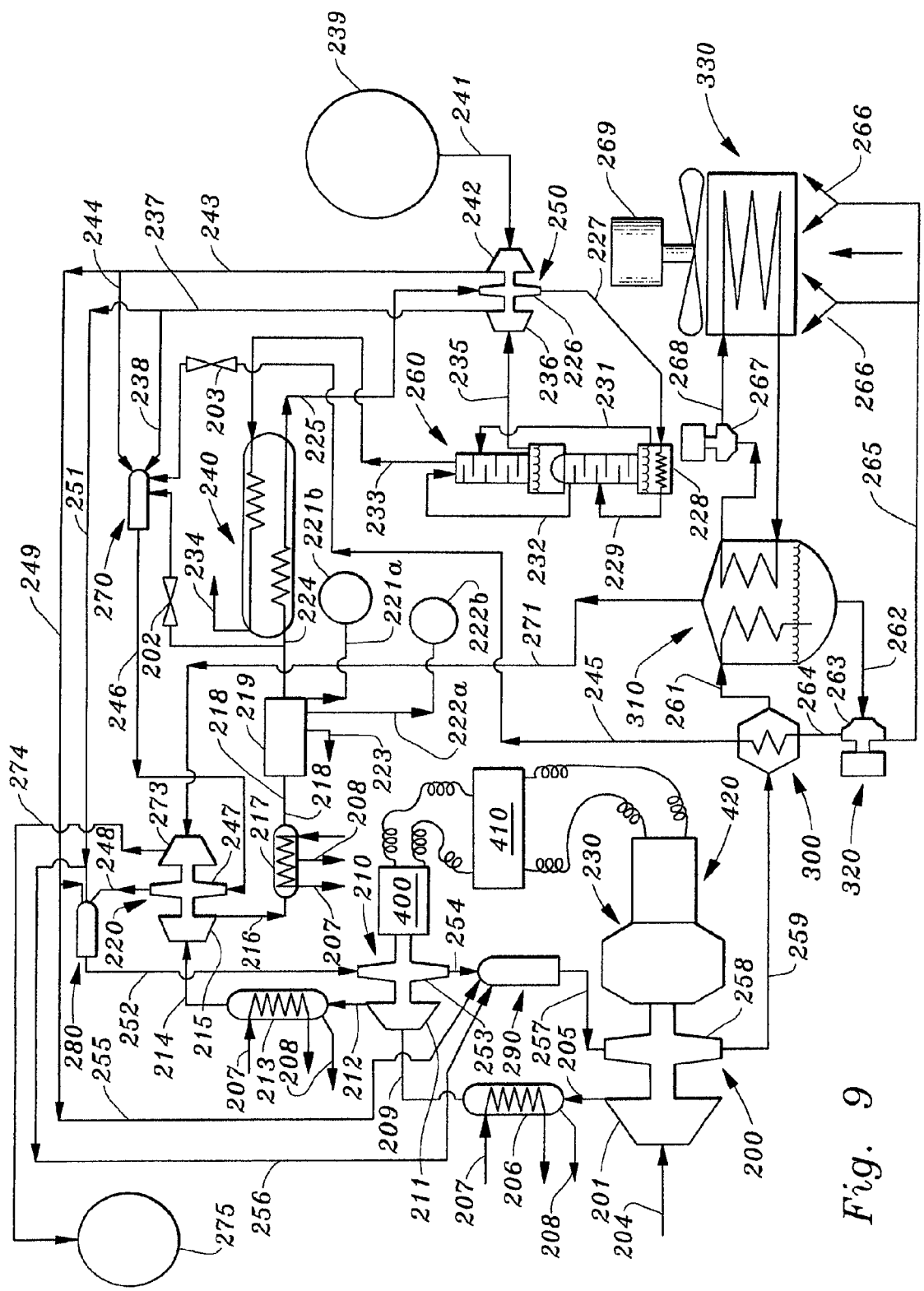
FIG. 9 is a schematic illustrating an embodiment of this invention that features a very low pollution or non-polluting hybrid engine with electric motor drive and a Rankine power cycle utilizing dynamic type turbomachinery. The Rankine power cycle utilizes regeneration and reheaters for increased cycle efficiency and power density.

A sixth embodiment of this invention; illustrated in FIG. 9, is similar to the fourth embodiment featuring reheaters, illustrated in FIG. 6, except all the machinery consists of dynamic type compressors and turbines. This type of machinery is more suitable for higher power levels (>1000 Shaft Horsepower (SHP)) required for rail, ship or standby power systems.

The Rankine engine consists of dynamic turbocompressors 200, 210, and 220, a power transmission 230, a heat exchanger 240, a turboexpander 250, a rectifier 260, a gas generator 270, a first reheater 280, a second reheater 290, a water heater 300, a condenser 310, a recirculating pump 320 and a condenser coolant radiator 330. The electric engine consists of an alternator 400, a battery 410 and electric motor 420.

Engine operation begins by starting the electric motor 420 using the battery 410 as the energy source. The electric motor 420 drives the dynamic compressor 201 through power transmission 230, and simultaneously, valve 202 is opened and valve 203 is closed. This initiates the start of the engine in a Brayton cycle mode. As engine speed increases valve 202 is gradually closed and valve 203 is gradually opened to slowly transition into the Rankine cycle mode and permit the liquefaction equipment to chill down. During this transitional period the electric motor 420 is used to maintain scheduled power and speed until steady state Rankine cycle conditions are achieved.

During thermal engine activation air enters turbocompressor 201 through duct 204 and is raised to the design discharge pressure. The air then exits through duct 205 into intercooler 206 where the heat of compression is removed by external cooling means 207 (i.e. air, water, Freon, etc.). Condensed water vapor is tapped-off by drain 208. After the air exits intercooler 206 through duct 209 at a temperature equal to the compressor inlet, it enters compressor 211 and is raised to the design discharge pressure. The air then exits through duct 212 into intercooler 213 and is again cooled to the inlet temperature of the compressor 201. This compression/cooling cycle is repeated as the air exits intercooler 213 through duct 214, enters compressor 215, then exits through duct 216, enters intercooler 217 and exits through duct 218 to complete the air pressurization.

The high pressure ambient temperature air then enters scrubber 219 where gases and fluids that are subject to freezing during the liquefaction process are removed (i.e. carbon dioxide, water vapor and oil). Carbon dioxide exits through duct 221a and is processed and stored in reservoir 221b. Oil is drained through duct 222a and stored in reservoir 222b. Water vapor is drained through duct 223 and discharged overboard.

The dry air then exits through duct 224 and enters the heat exchanger 240 where the air is cooled by returning gaseous nitrogen. It then exits through duct 225 and enters turboexpander 226 where the air temperature is further reduced to near liquid air temperature prior to exiting through duct 227 and enters the rectifier 260. The air exits from the rectifier heat exchanger 228 through duct 229 at liquid air temperature and enters the rectifier's lower column plates where oxygen/nitrogen separation is initiated. Liquid with 40% oxygen exits through duct 231 and enters the upper rectifier column where a higher percentage oxygen concentration is generated. Liquid nitrogen at 96% purity is recirculated from the lower rectifier column to the upper column by means of duct 232. Gaseous nitrogen at 99% purity (1% argon) exits through duct 233 and enters the heat exchanger 240 where cooling the incoming dry air is performed prior to discharging through duct 234 to the atmosphere at near ambient temperature and pressure. Gaseous oxygen or liquid oxygen at 95% purity (5% argon) exits through duct 235 and enters the turboexpander compressor 236 where the oxygen is pressurized to the design pressure. The high pressure oxygen then exits through duct 237 and enters the gas generator 270 through duct 238.

Fuel, i.e. methane, propane, purified natural gas and light alcohols such as methanol and ethanol, exits the fuel supply tank 239 through duct 241 and enters the compressor 242 of turboexpander 250 and is raised to the design discharge pressure. The pressurized fuel then exits through duct 243 and enters the gas generator 270 through duct 244 where it mixes with the incoming oxygen at stoichiometric mixture ratio to achieve complete combustion and maximum hot gas temperature (approximately 6500° R). The products of combustion of these reactants result in a high purity steam, carbon dioxide gas and a small amount of gaseous argon (4%).

Following complete combustion of the high temperature gases, recirculating water is injected into the gas generator through line 245 and dilutes the high temperature gases to a lower temperature drive gas acceptable to the dynamic turbine 247 (approximately 2000° R). The drive gas then exits the gas generator 270 through duct 246 and enters the turbine 247 of turbocompressor 220, where the gas expands and powers the air compressor 215 and the carbon dioxide compressor 273. The gas then exits through duct 248 and enters reheater 280 where the heat extracted due to the turbine 247 work is replenished. This heat is derived from the combustion of added fuel through duct 249 and added oxygen through duct 251 into reheater 280.

The reheated gas then exits through duct 252 and enters turbine 253 of turbocompressor 210 and expands to lower pressure. The power produced by these expanding gases drive the alternator 400 and compressor 211, then exhaust through duct 254 and enter reheater 290. The heat extracted from the gases resulting in the turbine work is replenished with the heat of combustion from added fuel through duct 255 and oxygen through duct 256.

The reheated gas then exits through duct 257, enters turbine 258 of turbocompressor 200 and drives compressor 201 and power transmission 230. The turbine exhaust gas then exits through duct 259 and enters water heater 300 where the residual heat of the turbine 258 exhaust is used to preheat the water that is being recirculated to the gas generator 270. The gas then exits through duct 261, enters the condenser 310 near or below atmospheric pressure, where condensation of the steam into water and separation of the carbon dioxide gas occurs.

The condensed water exits through line 262, enters the pump 263 where the pressure is raised to the supply level of the gas generator 270. A major portion of the discharge water from pump 263 exits through line 264, enters the water heater 300 where heat is absorbed from the turbine exhaust gas and then exists through line 245 for delivery to the gas generator 270. The remaining water from the discharge of pump 263 exits through line 265 and is sprayed through nozzles 266 into radiator 330 for evaporative cooling. Coolant for the condenser gas is recirculated by pump 267 to the radiator 330 through line 268, where heat is rejected to atmospheric air being pumped by fan 269.

The gaseous carbon dioxide, remaining from the condensation of steam, exits through duct 271 and enters compressor 273 of turbocompressor 220 and is compressed to slightly above atmospheric pressure (when condenser pressure is below atmospheric) and discharged through duct 274 into storage tank 275. The compressed carbon dioxide can be converted into a liquid or solid state for periodic removal, or the gas can be discharged into the atmosphere as local environmental laws permit.

Figure 10:
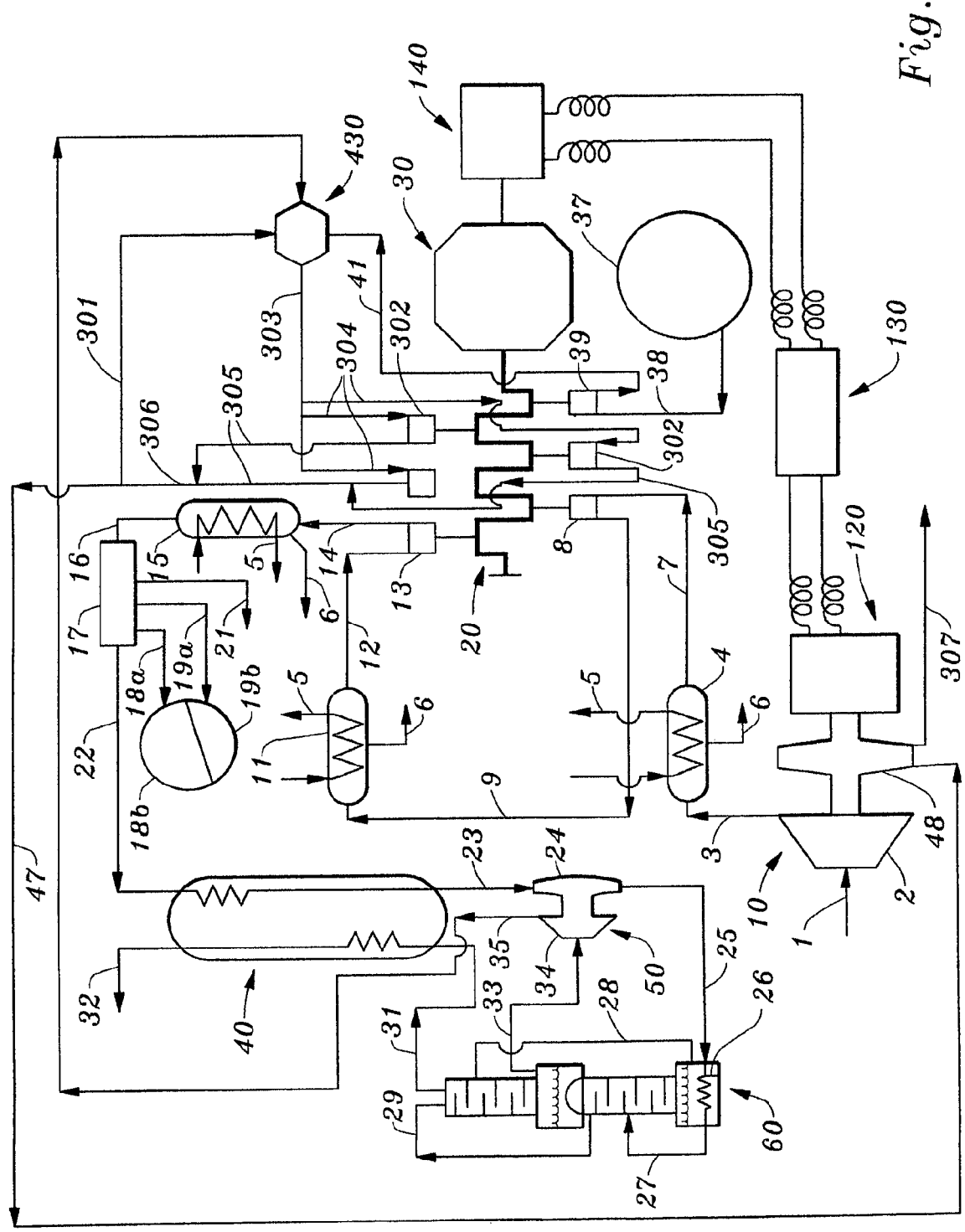
FIG. 10 is a schematic illustrating an embodiment of this invention that features a low polluting hybrid engine with an electric motor drive and an Otto power cycle reciprocating engine.

The seventh embodiment of this invention, illustrated in FIG. 10, includes the liquefaction system of the previous embodiments but utilizes the intermittent but spontaneous combustion process of the Otto cycle as the thermal power engine. This embodiment eliminates the need for the steam condenser and the recirculating water system.

The Otto cycle steam or steam/CO2 thermal engine consists of, in addition to the liquefaction system previously described, a premixer 430 where oxygen from duct 35, fuel from duct 41 and recirculating steam or steam/CO2 from duct 301 are premixed in the approximate ratio of 20%, 5% and 75% by weight respectively. These premixed gases are then directed to the reciprocating pistons 302 through duct 303 and ducts 304 where they are compressed and ignited with a spark ignition system identical to current Otto cycle engines. After the power stroke, the steam or steam/CO2 gases are discharged to the dynamic turbine 48 through ducts 305, 306 and then into duct 47. Some of the discharge gases are directed back to the premixer 430 through duct 301. The exhaust gases from the dynamic turbine 48 are then discharged to the atmosphere through duct 307.

Figure 11:
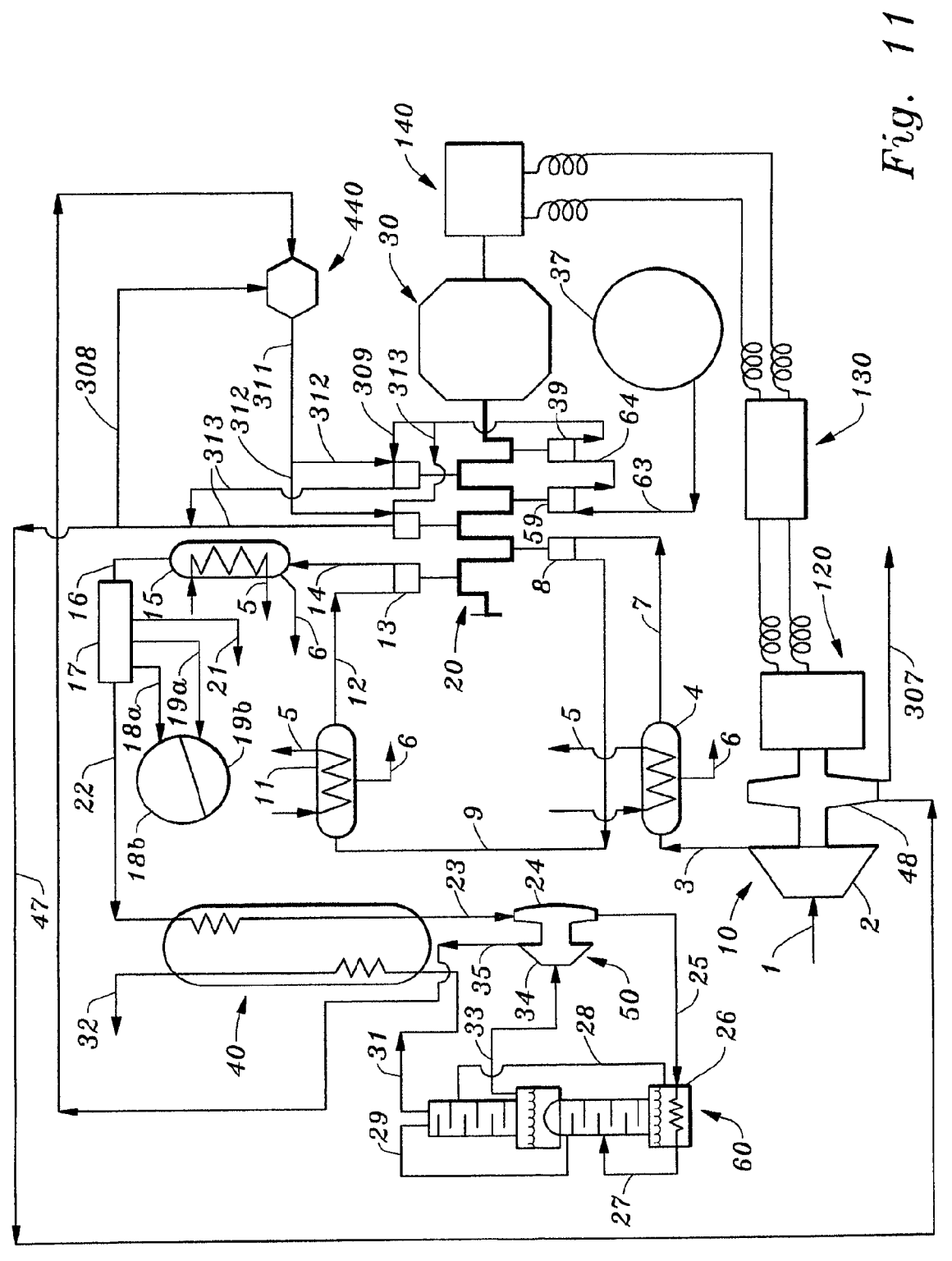

The eighth embodiment of this invention, illustrated in FIG. 11, is similar to the seventh embodiment, except a Diesel power cycle is used. In this system a premixer 440 mixes the oxygen from duct 35 with steam or steam/CO2 from duct 308, at an approximate mixture ratio of 23% and 77% by weight respectively, and discharges the gaseous mixture to the reciprocating pistons 309 through duct 311 and ducts 312 where the mixture is compressed to a high pre-ignition temperature. The high pressure fuel, at approximately 5% of the total weight of the gas mixture in the piston cylinder, is injected through ducts 313 and burns at approximately constant pressure. If necessary, an ignition device is located within the combustion cylinder. The hot gases then rapidly expand as the piston moves to the bottom of its power stroke. The steam/CO2 gases are then discharged into ducts 313 and delivered to the dynamic turbine 48 through duct 47. Some of the discharged gases are diverted to the premixer 440 through the duct 308. The exhaust gases from the dynamic turbine 48 are then discharged into the atmosphere through duct 307.

Figure 12:
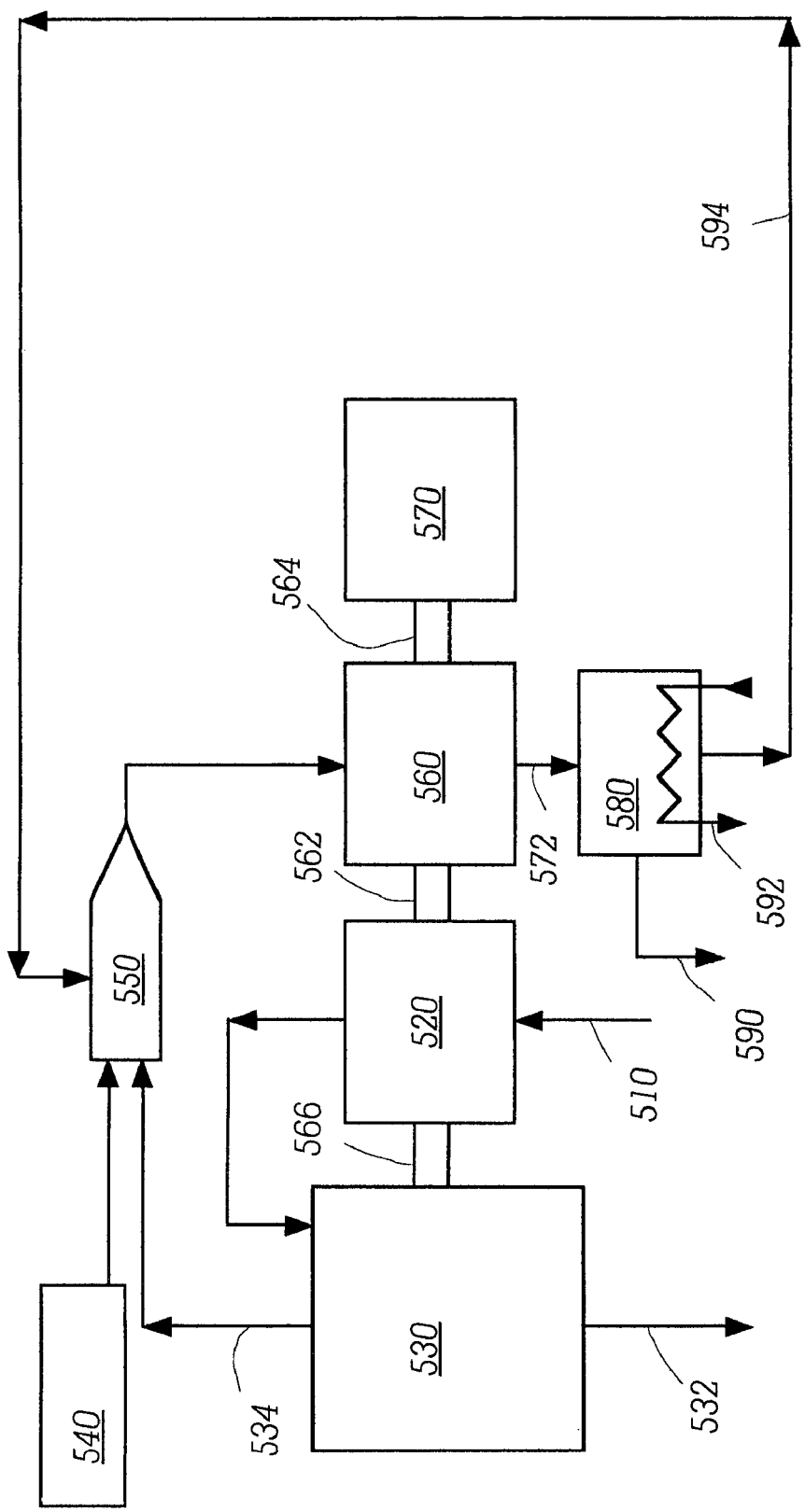
FIG. 12 is a schematic illustrating a basic low-polluting engine where a rectifier and air liquefaction devices of previous embodiments are replaced with an air separation plant which separates nitrogen from air by any of a variety of techniques including liquefaction, vapor pressure swing adsorption, membrane based air separation, etc.

FIG. 12 depicts a basic low-polluting engine 500 which conceptually represents many of the above-described first eight embodiments in a more simplified manner. Rather than identifying specific machinery, FIG. 12 depicts steps in the overall power production cycle. Additionally, the engine 500 of FIG. 12 replaces the rectifier and other liquefaction equipment of embodiments 1–8 with a more generalized air separation plant 530. Details of various different embodiments of this air separation plant 530 are provided in FIGS. 15 and 16 and described in detail herein below.

The basic low-polluting engine 500 operates in the following manner. Air from a surrounding environment enters through an air inlet 510 into an air compressor 520. The air compressor 520 elevates the air entering through the air inlet 510 and directs the compressed air to the air separation plant 530. Various different air separation techniques can be utilized by the air separation plant 530 so that enriched nitrogen gases exit the air separation plant 530 through an enriched nitrogen gas outlet 532 and enriched oxygen gases exit the air separation plant 530 through an enriched oxygen gases outlet 534. The enriched nitrogen gases outlet 532 typically returns back into the surrounding environment. The enriched oxygen gases outlet 534 leads to the combustion device 550.

In the combustion device 550, the enriched oxygen gases from the air separation plant 530 are combined with the hydrogen containing fuel from a fuel supply 540 and combustion is initiated within the combustion device 550. A water or carbon dioxide diluent is added into the combustion device to decrease a temperature of the products of combustion within the combustion device 550 and to increase a mass flow rate for a steam or steam and carbon dioxide working fluid exiting the combustion device 550.

This working fluid is then directed into an expander 560, such as a turbine. The turbine is coupled through a power transfer coupling 562 to the air compressor 520 to drive the air compressor 520. FIG. 12 shows a rotating shaft as one type of mechanical power transfer coupling 562. Another way to power the air compressor 520 is to generate electricity by means of the power absorber 570 and use part of the generated electricity to drive an electric motor which in turn powers the air compressor 520. The expander 560 also is coupled through a power transfer coupling 564 to a power absorber 570 such as an electric generator or a power transmission for a vehicle. The expander 560 is also coupled through a power transfer coupling 566 to the air separation plant 530 to drive machinery within the air separation plant 530.

The working fluid is then discharged from the expander 560 through a discharge 572. The discharge 572 leads to a condenser 580. The condenser has coolant passing through a coolant flow path 592 which causes water portions of the working fluid entering the condenser 580 to be condensed. A water and carbon dioxide outlet 590 is provided for excess water or water and carbon dioxide mixture from the condenser. A water or water and carbon dioxide diluent path is also provided out of the condenser 580 for returning water or water and carbon dioxide diluent back to the combustion device 550.

As should be readily apparent, the air compressor 520 is generally analogous to the turbocompressor 10 of the first embodiment. The air separation plant 530 is generally analogous to the rectifier 60 of the first embodiment. The fuel supply 540 is generally analogous to the fuel supply tank 37 of the first embodiment. The combustion device 550 is generally analogous to the gas generator 70 of the first embodiment. The expander 560 is generally analogous to the reciprocating cylinders 44, 46 of the reciprocating engine 20 of the first embodiment. The power absorber 570 is generally analogous to the power transmission 30 of the first embodiment and the condenser 580 is generally analogous to the condenser 80 of the first embodiment. Hence, the basic low-polluting engine schematic of FIG. 12 represented by reference numeral 500 merely provides an overall depiction of the power production cycle of this invention. While a specific analogy has been drawn between this basic low-polluting engine 500 and the first embodiment, shown in FIG. 1, similar analogies can be drawn to the other embodiments of this invention.

Figure 13:
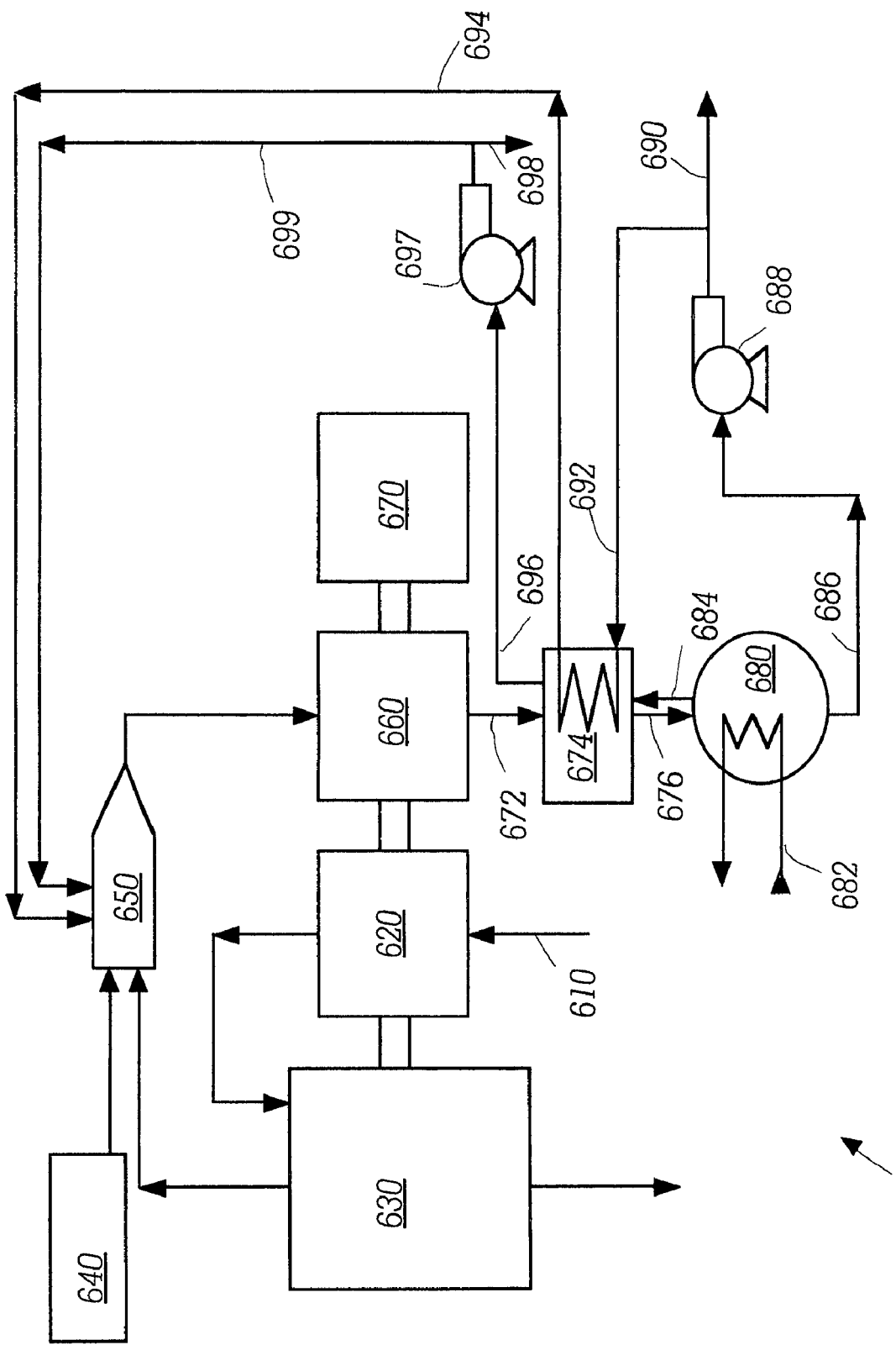
FIG. 13 is a schematic similar to that which is shown in FIG. 12 but including regeneration in the cycle disclosed therein.

With particular reference to FIG. 13, details of a basic low-polluting engine 600 featuring regeneration is provided. The low-polluting engine featuring regeneration 600 depicted in FIG. 13 is identical to the basic low-polluting engine 500 of FIG. 12 except that handling of the working fluid upon discharge from the expander 660 has been altered to feature regeneration. Specifically, the low-polluting engine featuring regeneration 600 includes an air inlet 610, air compressor 620, air separation plant 630, fuel supply 640, combustion device 650, expander 660 and power absorber 670 arranged similarly to the components 510, 520, 530, 540, 550, 560, 570 of the basic low-polluting engine 500 shown in FIG. 12.

In contrast, the low-polluting engine featuring regeneration 600 directs the working fluid through a discharge 672 which leads to a regenerator 674. The working fluid exits the regenerator 674 through a regenerator outlet 676. The regenerator outlet 676 leads to a condenser 680. Within the condenser 680, the working fluid is cooled by action of a coolant flowing along a coolant flow path 682 to be separated into carbon dioxide and water. The carbon dioxide exits the condenser 680 through a carbon dioxide outlet 684 and the water exits the condenser 680 through the water outlet 686. The water outlet 686 leads to a feed water pump 688. Excess water is discharged from the engine 600 at a water excess outlet 690. Other portions of the water are directed along a regenerator water flow path 692 through the regenerator 674 where the water is preheated. The water or steam leaves the regenerator 674 along a water diluent path 694 leading back to the combustion device 650.

The carbon dioxide outlet 684 from the condenser 680 also leads into the regenerator 674 for preheating of the carbon dioxide. The carbon dioxide leaves the regenerator along a regenerator carbon dioxide flow 696 which leads to a carbon dioxide compressor 697. The carbon dioxide compressor 697 in turn leads to a carbon dioxide excess outlet 698 where excess carbon dioxide is removed from the engine 600. If desired, a portion of the carbon dioxide can be directed along a carbon dioxide diluent path 699 back to the combustion device 650 for use as a diluent within the combustion device 650.

Figure 14:
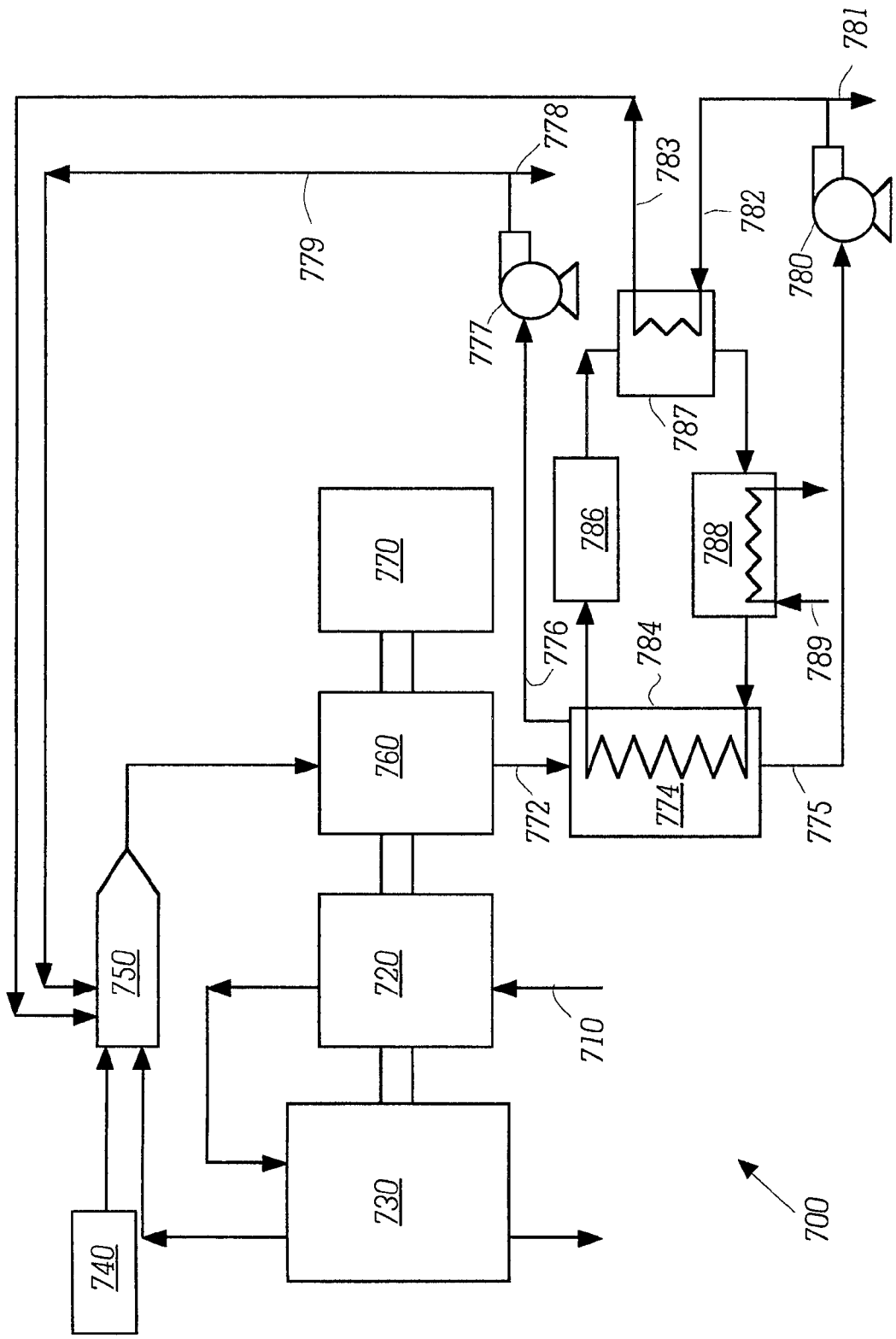
FIG. 14 is a schematic similar to that which is disclosed in FIGS. 12 and 13 except that a duel cycle arrangement is provided which features a bottoming cycle for enhanced efficiency.

With particular reference to FIG. 14, a basic low-polluting engine 700 with bottoming cycle is provided. As with the low-polluting engine featuring regeneration 600 of FIG. 13, portions of the low-polluting engine featuring a bottoming cycle 700 are similar to the basic low-polluting engine 500 of FIG. 12 up until discharge of the working fluid from the expander 560. Hence, the low polluting engine featuring a bottoming cycle 700 includes an air inlet 710, air compressor 720, air separation plant 730, fuel supply 740, combustion device 750, expander 760 and power absorber 770 having corresponding components in the engine 500 of FIG. 12.

The working fluid is discharged from the expander 760 through a discharge 772 leading to a Heat Recovery Steam Generator (HRSG)/condenser 774. The working fluid is condensed and a water outlet 775 directs water from the condenser 774 and a carbon dioxide outlet 776 directs carbon dioxide from the condenser 774. The carbon dioxide outlet 776 leads to a carbon dioxide compressor 777, a carbon dioxide excess outlet 778 and carbon dioxide diluent path 779 leading back to the combustion device 750.

The water outlet 775 leads to a feed water pump 780 which in turn leads to a water excess outlet 781 and a water regeneration path 782 where the water is regenerated within a bottoming regenerator 787. The water exits the bottoming regenerator 787 along a water diluent path 783 leading back to the combustion device 750.

The HRSG/condenser 774 and regenerator 787 are driven by a bottoming cycle including a bottoming cycle boiler 784 which boils water in the bottoming cycle from the discharge working fluid from the discharge 772 and entering the HRSG/condenser 774. The topping cycle also includes a bottoming turbine 786 and a bottoming regenerator 787 which cools steam exiting the steam turbine 786 and heats water entering the water diluent path 783. The bottoming cycle also includes a bottoming condenser 788 cooled by a coolant within a coolant line 789. Hence, the working fluid such as water within the bottoming cycle passes from the condenser 788 to the boiler 784 where the working fluid is heated and turned into a gas. Note that the HRSG/condenser 774 and boiler 784 are integrated together but that only heat exchange is allowed, not mixing. The bottoming cycle working fluid then passes through the turbine 786 for production of power which can be directed to the power absorber 770 or other components of the low-polluting engine featuring a bottoming cycle 700. The working fluid then exits the turbine 786 and is cooled in the regenerator 787 before returning to the condenser 788.

The air separation plants 530, 630, 730 of FIGS. 12–14 can be any of a variety of different apparatuses or systems which are capable of removing at least a portion of the nitrogen from air. For instance, and specifically discussed above with respect to the first through eighth embodiments of FIGS. 1–11, the air separation plant 530, 630, 730 can include a rectifier such as the rectifier 60 of FIG. 1 or other liquefaction equipment which separate nitrogen from the air by liquefaction.

Figure 15:
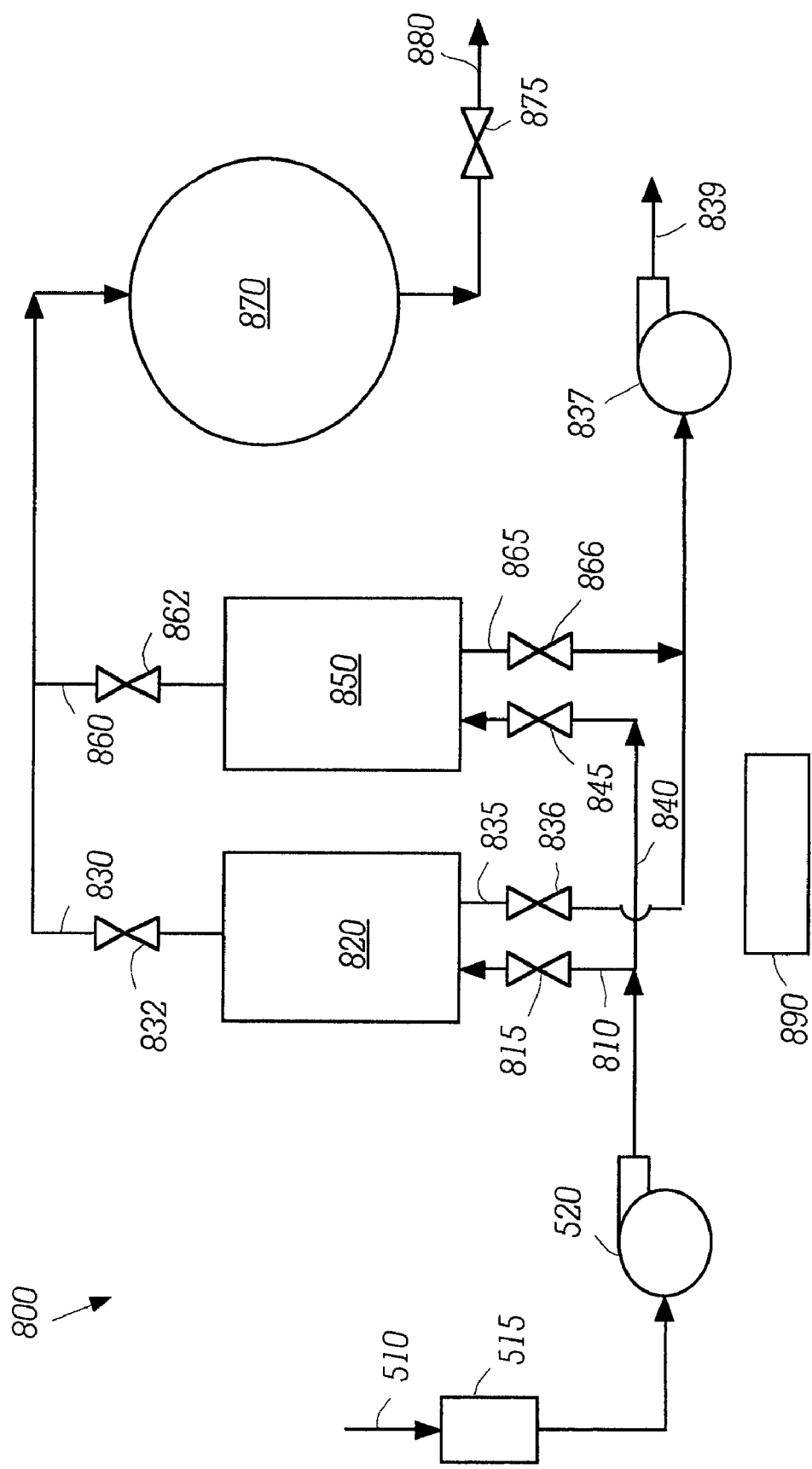
FIG. 15 is a schematic of a typical pressure swing adsorption plant for use as the air separation plant in one of the engines disclosed in FIGS. 12–14.

However, liquefaction processes are not the only processes that can remove at least a portion of nitrogen from air. Several other processes are available to achieve this goal. These processes, which are described in detail below, can be substituted for the cryogenic liquefaction process described in detail hereinabove. One alternative technique available for use in the air separation plant 530, 630, 730 is a pressure swing adsorption plant 800 (FIG. 15). The pressure swing adsorption process, also called vacuum pressure swing adsorption, uses materials which are capable of adsorption and desorption of oxygen or nitrogen such as, for example, synthetic zeolites. The vacuum pressure swing adsorption process can be used to separate oxygen and nitrogen from air.

The process typically employs two beds that go through swings in pressure from above atmospheric to below atmospheric pressure. Each bed cycles sequentially from adsorption to desorption and regeneration and back to adsorption. The two beds operate in a staggered arrangement in which one bed is adsorbing while the other bed is regenerating. Thus the beds alternately produce a gaseous product of high oxygen content. With this process, a gaseous mixture can be produced with a wide range of oxygen purities. As an example, oxygen purities ranging from 90% to 94% are used in many industrial applications and can be successfully produced with commercially available vacuum pressure swing adsorption processes such as those produced by Praxair, Inc. with world headquarters located at 39 Old Ridgebury Road, Danbury, Conn. 06810-5113.

With particular reference to FIG. 15, a layout of a typical pressure swing adsorption plant 800 is shown. Initially, the air inlet 510 and feed compressor 520 are provided analogous to the air inlet 510 and air compressor 520 of the basic low-polluting engine schematic 500 shown in FIG. 12. Preferably, a filter 515 is interposed between the air inlet and the feed compressor to filter particulates out of the air inlet stream. The compressed air discharged from the feed compressor 520 is directed to a first inlet line 810 passing through a first inlet line valve 815 and into a first enclosure 820.

The first enclosure 820 is provided with an appropriate material capable of adsorption and desorption of oxygen or nitrogen. One material that is used in these applications is zeolite. Two outlets are provided from the first enclosure 820 including a first oxygen outlet 830 coupled to the first enclosure 820 through a first valve 832 and a first nitrogen outlet 835 coupled to the first enclosure 820 through a first nitrogen valve 836. The first nitrogen outlet 835 leads to a nitrogen compressor 837 which raises the gases in the first nitrogen outlet 835 back to atmospheric pressure for discharge through nitrogen discharge 839. In fact, the first nitrogen outlet 835 and first oxygen outlet 830 do not contain pure oxygen or nitrogen but rather merely gases which are enriched in content with oxygen or nitrogen.

The first oxygen outlet 830 leads to a surge tank 870 with a valve 875 beyond the surge tank 870 and leading to an oxygen supply line 880. In parallel with the first enclosure 820, a second enclosure 850 is provided. The second enclosure 850 is similarly loaded with an appropriate material capable of adsorption and desorption of oxygen or nitrogen. A second inlet line 840 leads from the feed compressor 520 through a second inlet line valve 845 and into the second enclosure 850. A second oxygen outlet 860 leads out of the second enclosure 850 and on to the surge tank 870 through a second oxygen outlet valve 862. A second nitrogen outlet 865 also leads out of the second enclosure 850 through a second nitrogen outlet valve 866 and on to the compressor 837. A cycle controller 890 controls the opening and closing of the various valves 815, 832, 836, 845, 862, 866 and 875.

One typical operation sequence of the pressure swing adsorption plant 800 is as follows. Initially, all of the valves are closed except for the first nitrogen valve 836 and the nitrogen compressor 837 is used to reduce pressure in the first enclosure 820 to below atmospheric pressure. The first nitrogen valve 836 is then closed. Next, the first inlet valve 815 is opened. With the first inlet line valve 815 open and all other valves closed, the feed compressor directs air into the first enclosure 820.

As pressure builds up within the first enclosure 820, the material within the first enclosure 820 is caused to adsorb different molecules within the air in a discriminate fashion. For instance, the material can be selected to adsorb nitrogen at elevated pressure. At reduced pressure, the adsorption effect reverses to desorption.

In essence, if the material adsorbs nitrogen at pressures elevated above atmospheric pressure and desorbs nitrogen at pressures below atmospheric pressure, the various valves 815, 832, 836 and 875 are sequentially operated so that the first enclosure 820 has an elevated pressure and adsorbs nitrogen before the remaining enriched oxygen air is allowed to freely flow out of the first enclosure 820 along the first oxygen outlet 830. When the oxygen enclosure 820 has a pressure below atmospheric pressure, the material within the first enclosure 820 is desorbing the nitrogen while the first nitrogen outlet valve 836 is open. In this way, when nitrogen is being adsorbed, the remaining air within the first enclosure 820 is enriched in oxygen and is directed to the first oxygen outlet 830 and when the material within the enclosure 820 is desorbing the nitrogen, the nitrogen enriched gases within the first enclosure 820 are allowed to flow into the first nitrogen outlet 835 and to the nitrogen discharge 839.

The zeolite material within the enclosure 820 benefits from some residence time to adsorb as much nitrogen (or oxygen) as desired. During this time no oxygen rich or nitrogen rich gases flow to the oxygen supply line 880 or the nitrogen discharge 839. Hence, it is beneficial to use a second enclosure 850 similar to the first enclosure 820 while the valves 815, 832 and 836 are all closed and the zeolite material in the first enclosure 820 is adsorbing nitrogen (or oxygen).

Specifically the valves 845, 862 and 866 are sequentially opened and closed to cause the second enclosure 850 to operate in a manner similar to that outlined with reference to the first enclosure 820 above. When the material within the second enclosure 850 is adsorbing nitrogen (or oxygen) the process is reversed so that the first enclosure 820, having had its zeolite material appropriately desorbed, is brought back on line for repetition of the alternating pattern of use between the first enclosure 820 and the second enclosure 850. As should be apparent, additional enclosures besides the first enclosure 820 and second enclosure 850 could be utilized if the adsorbing material requires more residence time or to increase the overall throughput of oxygen enriched gases from the air. Over time, the material within the first enclosure 820 which adsorbs and desorbs the oxygen or nitrogen tends to lose its effectiveness. The material can be regenerated, if it is in the form of a synthetic zeolite, by application of heat or other regeneration means. Accordingly, when the material within the first enclosure 820 begins to lose its effectiveness, such a heat treatment can be performed or the zeolite material replaced. Should the adsorbing material be configured to adsorb and desorb oxygen rather than nitrogen, the above described operation of the pressure swing adsorption plant 800 would be adjusted to provide the desired separation of oxygen from nitrogen.

Figure 16:
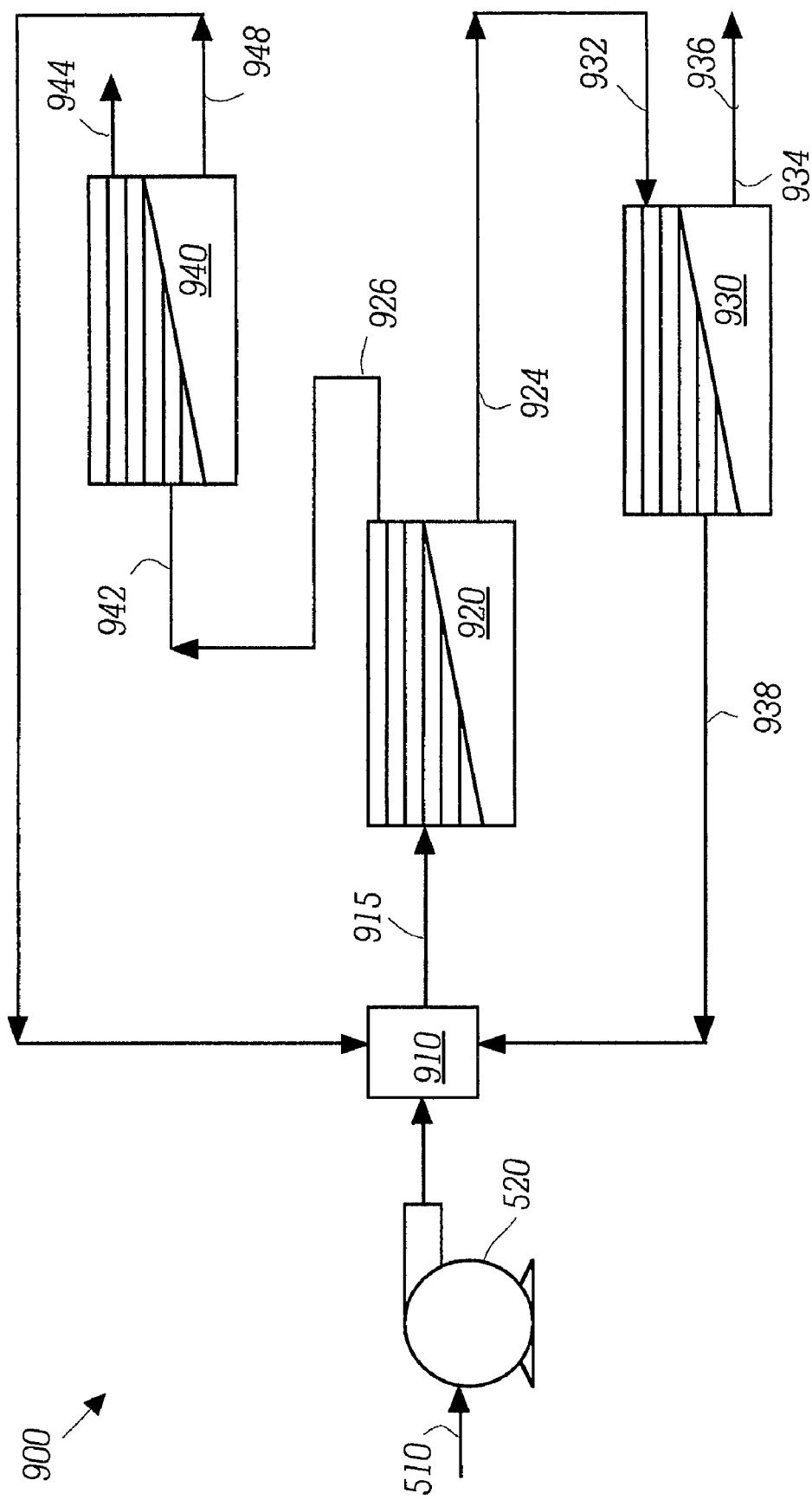
FIG. 16 is a schematic of a membrane flow two stage enrichment of oxygen and nitrogen system for use as part of the air separation plant of the cycles disclosed in FIGS. 12–14.

With particular reference to FIG. 16, details of an alternative apparatus and system for use within the air separation plants 530, 630, 730 is provided. In such membrane-based air separation systems 900 the separation of air into its components is achieved by passing an air feed stream under pressure over a membrane. The pressure gradient across the membrane causes the most permeable component to pass through the membrane more rapidly than other components, thereby creating a product stream that is enriched in this component while the feed stream is depleted in this component.

The transport of the air through a membrane can follow several physical processes. As an example, these processes could be: 1) Knudsen flow separation which is based on molecular weight differences between the gases; 2) Ultra-microporous molecular sieving separation; and 3) Solution-diffusion separation which is based both on solubility and mobility factors. In the case of a solution-diffusion process the air first dissolves in a polymer, then diffuses through its thickness and then evaporates from the other side into the product stream.

Several types of membranes are available for this process, each having specific advantages in particular situations. For example, cellulose acetate membranes exhibit good separation factors for oxygen and nitrogen, but have low flux rates. Thin film composite membranes placed over microporous polysulfone exhibits lower separation factors than cellulose acetate, but have a higher flux at the same pressure differential. Repeating the process in a series configuration can increase the oxygen concentration in the product stream. For example, one industrial membrane, in two passes, may enrich the oxygen content of air to about 50%.

The above described membrane processes operate at a temperature that is near ambient temperature. A higher-than-ambient temperature may arise as a result of a possible temperature rise resulting from pressurization of the air feed stream to create a pressure difference across the membrane.

Still another membrane separation process uses an electroceramic membrane. Electroceramics are ionic solid solutions that permit movement of ions. To become appreciably mobile, the oxide ion, because of its size and charge, requires a high temperature (about 800° F.) to overcome the solid oxide lattice energy. The electroceramic membrane process integrates well with the production of power described in this invention because the power generating process produces waste heat that can be used to generate the required operating temperature of the membrane. For instance, and with reference to FIG. 12, the expander 560 and gas generator 550 can be configured such that the working fluid exiting the expander 560 at the discharge 572 has a temperature at or above 800° F. The working fluid can then be routed to a heat exchanger which heats the electroceramic membranes to 800° F. for use in the air development system 530.

The oxygen ions move through the lattice because of a gradient in pressure across the membrane. On the high oxygen partial pressure side of the membrane, oxygen is reduced when it receives four electrons and occupies two vacancies. At the low oxygen partial pressure side, vacancies are created by the reverse reaction. Oxide ions at the low partial pressure side can be removed by liberation of oxygen. The rate of diffusion through the membrane is determined by ion mobility. This mobility is a characteristic of a particular material, and is dependent on the size, charge and geometry of the cations in the lattice. A possible material for formation of the electroceramic membrane is yttria stabilized zirconia.

With particular reference to FIG. 16, one arrangement for the membrane based air separation system for use in the air separation plants 530, 630, 730 is depicted by reference numeral 900. In this embodiment for the air separation plant, an air inlet 510 and feed compressor 520 are provided similar to the air inlet 510 and feed compressor 520 disclosed in FIG. 12 with regard to the basic low-polluting engine 500. The compressed air is then directed to a junction 910 where return flows from various membrane chambers return for reprocessing and are combined together within the junction 910. A junction outlet 915 provides the only outlet from the junction 910. The junction outlet 915 leads to a first membrane enclosure 920.

The first membrane enclosure 920 is preferably an enclosure which has an inlet and a membrane dividing the enclosure into two regions. Two outlets are provided in the enclosure. One of the outlets is on the same side of the membrane as the inlet and the other outlet is located on a side of the membrane opposite the inlet. If the membrane is of a type which allows oxygen to pass more readily there through than nitrogen, an oxygen rich outlet 924 is located on the downstream side of the membrane and a nitrogen rich outlet 926 is located on a same side of the membrane as the inlet 915. If the membrane allows nitrogen to pass more readily there through, the arrangement of the outlets is reversed.

The junction outlet 915 passes into the first membrane enclosure 920 through the inlet in the first membrane enclosure 920. Because oxygen flows more readily through the membrane within the first membrane enclosure 920, gases flowing through the oxygen rich outlet 924 have an increased percentage of oxygen with respect to standard atmospheric oxygen percentages and the nitrogen rich outlet 926 has a nitrogen content which is greater than that of standard atmospheric conditions.

The oxygen rich outlet 924 leads to a second membrane enclosure 930 where it enters the second membrane enclosure 930 through an oxygen rich inlet 932. The second membrane enclosure 930 is arranged similarly to the first membrane enclosure 920. Hence, a membrane is provided within the second membrane enclosure 930 and two outlets are provided including an oxygen super rich outlet 934 on a side of the membrane opposite the oxygen rich inlet 932 and a second outlet 938 located on a common side of the membrane within the second membrane enclosure 930 as the oxygen rich inlet 932.

The oxygen super rich outlet 934 leads to an oxygen supply 936 for use within one of the engines 500, 600, 700 discussed above. The gases flowing through the second outlet 938 typically have oxygen and nitrogen contents matching that of standard atmospheric conditions but maintaining an elevated pressure. The second outlet 938 returns back to the junction 910 for combining with air exiting the feed compressor 520 and for repassing through the first membrane enclosure 920 as discussed above.

The nitrogen rich outlet 926 exiting the first membrane enclosure 920 is passed to a third membrane enclosure 940 where it enters the third membrane enclosure 940 through a nitrogen rich inlet 942. The third membrane enclosure 940 is similarly arranged to the first membrane enclosure 920 and second membrane enclosure 930 such that a membrane is located within the third membrane enclosure 940 and two outlets are provided from the third membrane enclosure 940. One of the outlets is a nitrogen super rich outlet 944 on a side of the membrane within the third membrane enclosure 940 similar to that of the nitrogen rich inlet 942. The nitrogen super rich outlet 944 can lead to a surrounding atmosphere or be used for processes where a high nitrogen content gas is desirable.

A third permeate return 948 provides an outlet from the third membrane enclosure 940 which is on a side of the membrane within the third membrane enclosure 940 opposite the location of the nitrogen rich inlet 942. The third permeate return 948 leads back to the junction 910 for reprocessing of the still pressurized air exiting the third membrane enclosure 940 through the third permeate return 948. This air passing through the third permeate return 948 is typically similar in content to the second permeate return 938 and the air exiting the feed compressor 520.

While many different types of membranes can be utilized within the first membrane enclosure 920, second membrane enclosure 930 and third membrane enclosure 940, the type of membrane would typically not alter the general arrangement of the membrane enclosures 920, 930, 940 and conduits for directing gases between the various permeates 920, 930, 940 and other components of the membrane based air separation plant 900 of FIG. 16.

While various different techniques have been disclosed for separation of nitrogen and oxygen from air, this description is not provided to identify every possible air separation process or apparatus. For example, economic and other consideration may make application of combinations of the above described processes advantageous. Rather, these examples are presented to indicate that several separation processes are available to accomplish the goal of enriching the oxygen content of air supplied to a combustion device and decreasing a corresponding nitrogen content of the air supply to a combustion device. By reducing an amount of nitrogen passing into a combustion device such as these combustion devices 550, 650, 750, an amount of nitrogen oxides produced as products of combustion within the combustion device 550, 650, 750 is reduced and low-pollution combustion based power production results.

Figure 17:
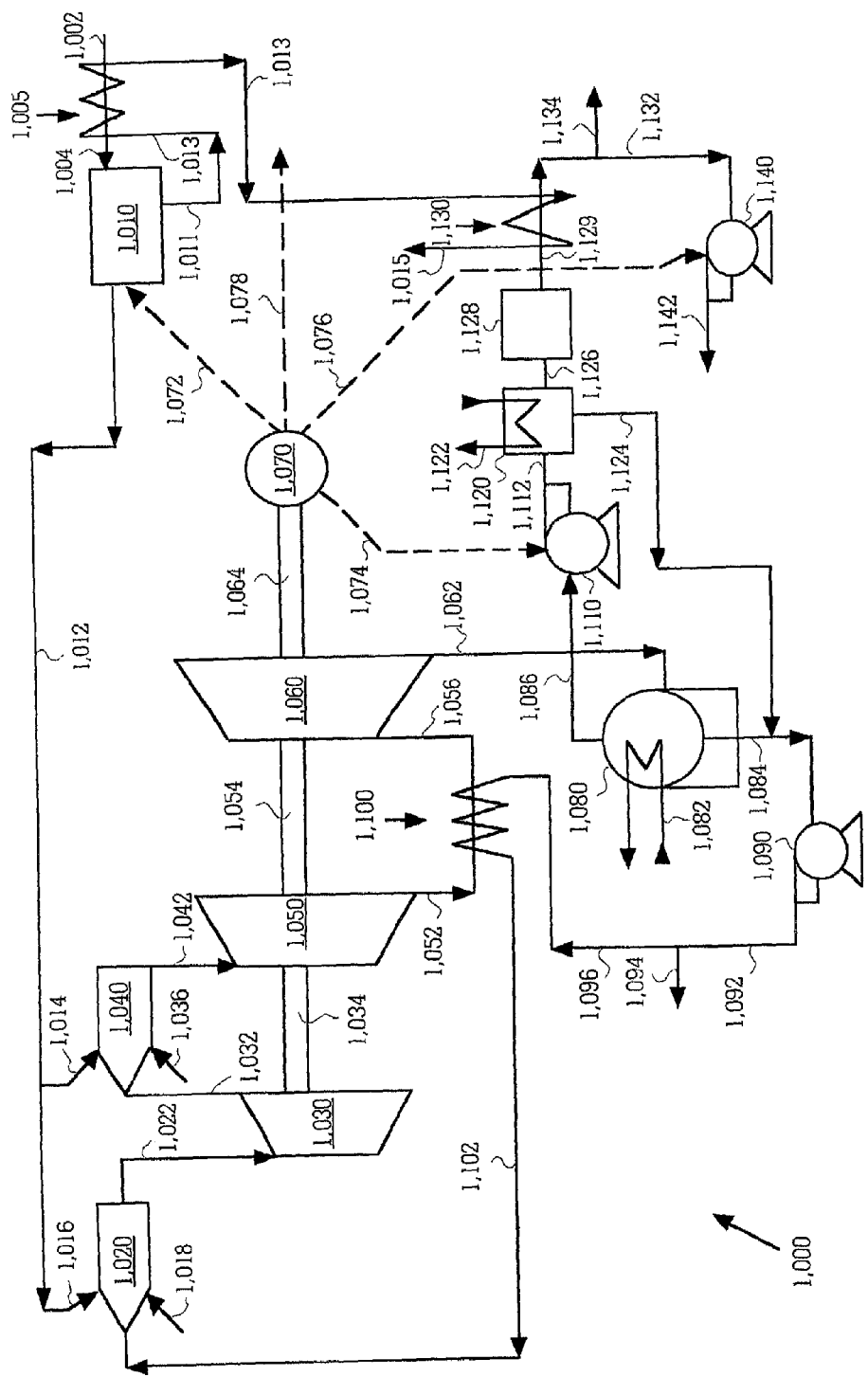
FIG. 17 is a system diagram of the hydrocarbon combustion power generation system of this invention with CO2 compression and liquefaction for injection into a terrestrial formation.

FIG. 17 depicts a preferred embodiment of this invention which not only emits low or zero pollutants but additionally isolates and conditions CO2 for sequestering into deep underground or undersea locations. While this preferred embodiment shows a specific arrangement of components including combustors, turbines, condensers and compressors, the CO2 sequestration portion of this system could readily be adapted for use with many of the above-identified embodiments. Particularly, each of the embodiments identified above which utilizes a hydrogen and carbon containing fuel, rather than merely hydrogen as the fuel, includes carbon dioxide as one of the combustion products. The CO2 isolation and sequestration portion of the preferred embodiment of FIG. 17 can be adapted to work with each of these hydrocarbon and carbon containing fuel embodiments to provide an additional benefit to these embodiments.

Specifically, and with particular reference to FIG. 17 the preferred embodiment of a hydrocarbon combustion power generation system with CO2 sequestration 1,000 is described. For clarity, reference numerals divisible by 10 are provided for various components of the system 1,000 and other reference numerals are provided for various different flow pathways of the system 1,000. The various different flow pathways could be in the form of hollow rigid or flexible tubing with appropriate insulation and with appropriate wall thicknesses for pressure handling capability depending on the material temperature and pressure conditions therein.

Initially, air is drawn from the atmosphere or some other source of air and passes along line 1,002 for entry into the air separation plant 1,010. Before the air passes into the air separation plant 1,010, the line 1,002 would typically pass through a filter to remove particulates, a drier to remove moisture and a precooler 1,005 to decrease the temperature of the air. A line 1,004 exits the precooler 1,005 and transports the air into the air separation plant 1,010. In this preferred system 1,000 the air separation plant 1,010 utilizes liquefaction techniques to separate oxygen in the air from nitrogen in the air. Hence, significant cooling of the air is necessary and the precooler 1,005 beneficially assists in this cooling process. However, other air separation techniques are known, as identified above. If such non-liquefaction air separation techniques are utilized, the precooler 1,005 would not be necessary.

Regardless of the air separation technique utilized by the air separation plant 1,010, two outlets for the air separation plant 1,010 are provided including an oxygen outlet into line 1,012 and a nitrogen outlet into line 1,011. If the air separation plant 1,010 only removes a portion of the nitrogen in the air, the oxygen outlet will in fact be for oxygen enriched air rather than pure oxygen. Line 1,011 can direct the nitrogen which, when liquefaction is used in the air separation plant 1,010, is below a temperature of air entering the air separation plant 1,010 along line 1,002. Hence, line 1,011 directs nitrogen to the precooler 1,005 for cooling of the incoming air in line 1,002. The nitrogen then exits the precooler 1,005 along line 1,013 and is then utilized to cool carbon dioxide (CO2) generated as combustion products of the system 1,000 as discussed in detail below. The nitrogen in line 1,013, after being utilized to cool the CO2, can be released into the atmosphere along line 1,015. Because nitrogen constitutes over three-quarters of air no contamination of the atmosphere results from discharge of the nitrogen into the atmosphere from line 1,015.

The oxygen exiting the air separation plant 1,010 passes along line 1,012 and is fed to oxygen feed lines 1,014 and 1,016. The oxygen feed line 1,016 passes into a combustor 1,020. The combustor 1,020 additionally includes a fuel feed line 1,018 leading from a source of fuel into the combustor 1,020. While various different hydrocarbon fuels can be utilized in the combustor 1,020, including simple hydrocarbons and light alcohols, the fuel is preferably methane. The combustor 1,020 additionally has water fed into the combustor 1,020 along line 1,102 to provide cooling within the combustor 1,020 and to increase a mass flow rate of combustion products exiting the combustor 1,020 along line 1,022. Preferably, the combustor 1,020 includes an ignition device and is constructed in a manner to operate at a high temperature and high pressure. Specifically, the combustor could operate at a pressure of 1,200 psia and 1,600° F., if near term existing technology components are utilized and up to 3,200 psia and 3,200° F. if known hardware designs, which are not yet readily available but are anticipated to be available in the long term, are utilized.

One such combustor which exhibits the basic characteristics necessary for combustion of the hydrocarbon fuel with the oxygen and which allows for water injection and mixing with the combustion products is described in U.S. Pat. No. 5,709,077 and provided by Clean Energy Systems, Inc. of Sacramento, Calif. The contents of this patent are hereby incorporated by reference into this description.

The combustion products exit the combustor 1,020 along line 1,022 and are then directed to a high pressure turbine 1,030. While the high pressure turbine 1,030 is preferred, other expansion devices such as pistons could similarly be utilized. The high pressure turbine 1,030 is preferably similar to that which has been demonstrated which feature high temperature, high pressure materials utilized as necessary to handle the temperatures and pressures of the combustion products in the ranges discussed above. One such turbine is manufactured by Solar Turbines, Inc. of San Diego, Calif.

The high pressure turbine 1,030 discharges the combustion products along line 1,032 which leads to the reheater 1,040. The high pressure turbine 1,030 also discharges power to shaft 1,034 which can either be coupled directly to a generator 1,070, be utilized to provide power to another power absorption device such as a propulsion system of a vehicle or a rotational power output shaft for a system requiring such rotational power, or can be coupled to other turbines or compressors of this system 1,000.

The combustion products passing along line 1,032 enter the reheater 1,040 along with oxygen from line 1,014 and fuel such as methane from fuel feed line 1,036. The reheater 1,040 is similar in configuration to the combustor 1,020 except that the combustion products including both H2O and CO2 are directed into the reheater rather than merely H2O as with the combustor 1,020 and the pressure and temperature of the combustion products entering the reheater 1,040 are greater than the temperature of the H2O entering the combustor 1,020 from the feed water line 1,102.

The reheater 1,040 combusts the fuel from the fuel line 1,036 with the oxygen from line 1,014 to produce additional combustion products including H2O and CO2. These combustion products generated within the reheater are mixed with the combustion products entering the reheater from line 1,032 and originally generated within the combustor 1,020. Preferably, the combined combustion products exit the reheater 1,040 along line 1,042 and have a pressure of 120 psia and a temperature of 2,600° F. if near term available components are used in the system 1,000 and 220 psia and 3,200° F. if components available in the long term are utilized in the system 1,000. The intermediate pressure turbine 1,050 typically features turbine blade cooling and high temperature materials similar to the technology developed by the gas turbine industry, i.e. General Electric, Solar Turbines, etc.

These combined combustion products including H2O and CO2 pass along line 1,042 and into intermediate pressure turbine 1,050. After expansion within the intermediate pressure turbine 1,050 the combustion products exit the intermediate pressure turbine 1,050 through turbine discharge 1,052. At the turbine discharge 1,052 the combustion products preferably have a pressure of 12 psia and a temperature of 1,400° F. if near term available components are used in the system 1,000 and 15 psia and 2,000° F. if long term available components are used in the system 1,000.

The intermediate pressure turbine 1,050 is additionally coupled to a power output shaft 1,054 which can either be coupled directly to the generator 1,070, or utilized to drive other components within the system 1,000 or provide rotational power output from the system 1,000. Preferably, the power output shaft 1,034 from the high pressure turbine 1,030 and the power output shaft 1,054 from the intermediate pressure turbine 1,050 are joined together and coupled to the generator 1,070.

The combustion products exiting the intermediate pressure turbine 1,050 along turbine discharge line 1,052 pass through a feed water preheater 1,100 which provides preheating for the H2O passing along line 1,102 and entering the combustor 1,020. After the combustion products pass through the feed water preheater 1,100, the combustion products pass along line 1,056 into the low pressure turbine 1,060. The combustion products preferably nearly maintain their pressure through the feed water preheater 1,100 but decrease in temperature, preferably by approximately 200° F. The combustion products then enter the low pressure turbine 1,060 where the combustion products are further expanded and discharged along line 1,062.

The low pressure turbine 1,060 is preferably coupled to the generator 1,070 through a power output shaft 1,064 which is in turn coupled to power output shaft 1,034 and 1,054. The generator 1,070 can either provide rotational shaft power to rotational equipment such as compressors and other components of the system 1,000 requiring rotational shaft power or can generate electricity and utilize that electricity to power various components of the system 1,000. For instance, power from the generator 1,070 can be directed along line 1,072 to the air separation plant 1,010 to provide power to the air separation plant 1,010 as necessary to separate the oxygen from the nitrogen. Power can be transmitted from the generator 1,070 along line 1,074 to a CO2 compressor 1,110 discussed in detail below or along line 1,076 to a CO2 pump 1,140 discussed in detail below or can be outputted from the system along line 1,078 for delivery as electric power to a power grid or as electric power or shaft power to provide power in any manner desired.

The combustion products exiting the low pressure turbine 1,060 along line 1,062 preferably include only H2O and CO2. Alternatively, if the air separation plant 1,010 does not completely separate oxygen from other air constituents, or contaminates are introduced into the combustion products from the fuel, some additional constituents may be present within the combustion products. If such additional constituents are present, they can be removed from the H2O and CO2 combustion products or handled along with the H2O or CO2 combustion products.

The combustion products pass along line 1,062 into the condenser 1,080. The condenser 1,080 provides one form of a combustion products separator. The condenser 1,080 is cooled with a coolant such as H2O passing through the condenser 1,080 along line 1,082. This coolant maintains conditions within the condenser 1,080 at a temperature and pressure at which most of the H2O condenses into a liquid phase and CO2 remains in a gaseous phase. Preferably, these conditions within the condenser are 1.5–2.0 psia and 80–100° F.

A condenser liquid outlet leads to line 1,084 which in turn leads to a feed water pump 1,090. The feed water pump 1,090 increases a pressure of the H2O exiting the condenser 1,080 along line 1,084 and discharges the elevated pressure H2O along line 1,092. Excess H2O can be removed from line 1,092 along line 1,094. Remaining H2O passes along line 1,096 to the feed water preheater 1,100. The H2O then exits the feed water preheater 1,100 along line 1,102 for return to the combustor 1,020 as discussed above.

The condenser 1,080 includes a gaseous products of combustion outlet which leads to a line 1,086. The gaseous products of combustion exiting the condenser 1,080 along line 1,086 are primarily CO2. However, some H2O vapor would typically be present in the gaseous CO2 and exit the condenser 1,080 along line 1,086.

The line 1,086 leads to CO2 compressor 1,110. The CO2 compressor 1,110 can either be driven from one of the turbines 1,030, 1,050, 1,060 or from power from the generator 1,070 or from any other appropriate power source. The CO2 compressor 1,110 elevates the pressure of the gaseous products of combustion entering the CO2 compressor 1,110 along line 1,086 to a pressure at which CO2 can be liquefied.

The CO2 compressor discharges the gaseous combustion products along line 1,112 which leads to a cooler/condenser 1,120. The cooler/condenser 1,120 is cooled with a coolant such as H2O passing along line 1,122 in the cooler/condenser 1,120. With the increase in pressure resulting from passage through the CO2 compressor 1,110 and the decreasing temperature resulting from the cooler/condenser 1,120, the non-CO2 gaseous products of combustion with boiling points higher than CO2, such as water vapor, are further encouraged to condense into a liquid phase for removal. A liquid outlet from the cooler/condenser 1,120 leads to line 1,124 where H2O condensed within the cooler/condenser 1,120 is returned to line 1,084 and passed to the feed water pump 1,090. The remaining gaseous products of combustion are primarily CO2 passing along line 1,126. A small amount of water vapor and some other gases such as argon, oxygen and nitrogen may still be present along with the CO2. Because argon, oxygen and nitrogen are not present in large amounts, they can typically be allowed to remain along with the CO2 or removed after liquefaction of the CO2 as discussed below. Alternatively, argon can be collected for use or sale from line 1,134.

The CO2 passes along line 1,126 to a drier 1,128 containing molecular sieves to remove the remaining moisture and exits the drier 1,128 via line 1,129. Line 1,129 leads to a cooler 1,130. The cooler 1,130 chills the CO2 passing along line 1,129 to a temperature below a liquefaction temperature of CO2 so that the CO2 is liquefied. Preferably, the CO2 is cooled to a temperature of −40° F. at a pressure of 145 psia and exits the cooler 1,130 along line 1,132. The cooler 1,130 can be powered in a variety of different manners to provide appropriate heat removal from the CO2 passing through the cooler 1,130. Preferably, the cooler 1,130 draws heat from the CO2 by routing cooled nitrogen from the air separation plant 1,010 along lines 1,011 and 1,013 through a heat exchanger with the CO2 passing along line 1,129 to produce the desired cooling of the CO2 before exiting the cooler 1,130 along line 1,132. If non-liquefaction air separation techniques are utilized in the air separation plant 1,010, other refrigeration type systems could be utilized in the cooler 1,030 to appropriately cool the CO2 into a liquid phase.

The liquid CO2 can be separated from any gases which have remained with the CO2 along line 1,132, such as argon or other trace gases which may have passed through the system 1,000. The argon or other trace gases exit cooler 1,130 via line 1,134 and are vented to the atmosphere or ducted to an argon recovery system and/or other recovery system as appropriate to economic and emission considerations. The liquid CO2 passes along line 1,132 to a CO2 pump 1,140. The CO2 pump 1,140 can be powered by one of the turbines 1,030, 1050, 1060 or from electricity produced by the generator 1,070 or from other separate power sources.

The CO2 pump 1,140 preferably pressurizes the CO2 to a pressure matching a pressure which exists at the depth within a terrestrial formation at which the CO2 is to be injected after leaving the pump 1,140 along line 1,142. Typically, such pressures would be between 3,000 and 10,000 psia. Such pressures should not exceed the fracture pressures of the formation. Preferably, the pressure of the CO2 in the injection well at the face of the subterranean formation in which the CO2 is to be injected should range from a minimum pressure of 10 psi above the pressure of the fluid in the formation to a maximum pressure that is obtained by multiplying the depth of the formation by a factor of 0.8 psi per foot of depth.

By liquefying the CO2 before pressurizing it to these high pressures, significantly less energy is required. Alternatively, the CO2 stream exiting secondary cooler/condenser 1,120 via line 1,126 may be compressed through additional stages of compression to a super critical fluid at the desired pressure rather than liquefied and pumped to a high pressure. The alternative is less energy efficient but may be more economical because of lower capital and/or operating costs.

One means to deliver the CO2 includes use of a pipeline or mobile tank system to transport the CO2 to an injection interface, such as a well head, above the sequestration site.

The terrestrial formation in which CO2 injection occurs would typically be below the water table and can be in the form of a geological porous formation which has been evacuated of liquid fossil fuels and for which an existing well already exists with a casing capable of handling the pressures involved. Otherwise, wells can be drilled into the designated geological formations and then appropriate casings provided in the well so that migration of the CO2 back up to the surface and into the surrounding atmosphere is mitigated. A desirable thickness of the formation into which the brine is to be injected is 200 feet or more. Moreover, the CO2 needs to be compatible with formation fluids in order to minimize reduction of injectivity, or plugging or other formation damage.

Alternatively, the terrestrial formation can be a deep confined aquifer or a deep ocean location. The high pressure CO2 can be pumped down into a deep aquifer, sea or ocean location. If the discharge of the CO2 is sufficiently deep, the CO2 can remain in a liquid form upon discharge and will not evaporate into a gaseous phase and migrate to the surface. Other porous geological formations where CO2 can be sequestered include salt caverns, sulfur caverns and sulfur domes.

Once the CO2 has been separated from other combustion products it could be utilized for various different industrial processes where CO2 is required, such that the CO2 is not released into the atmosphere.

Figure 18:
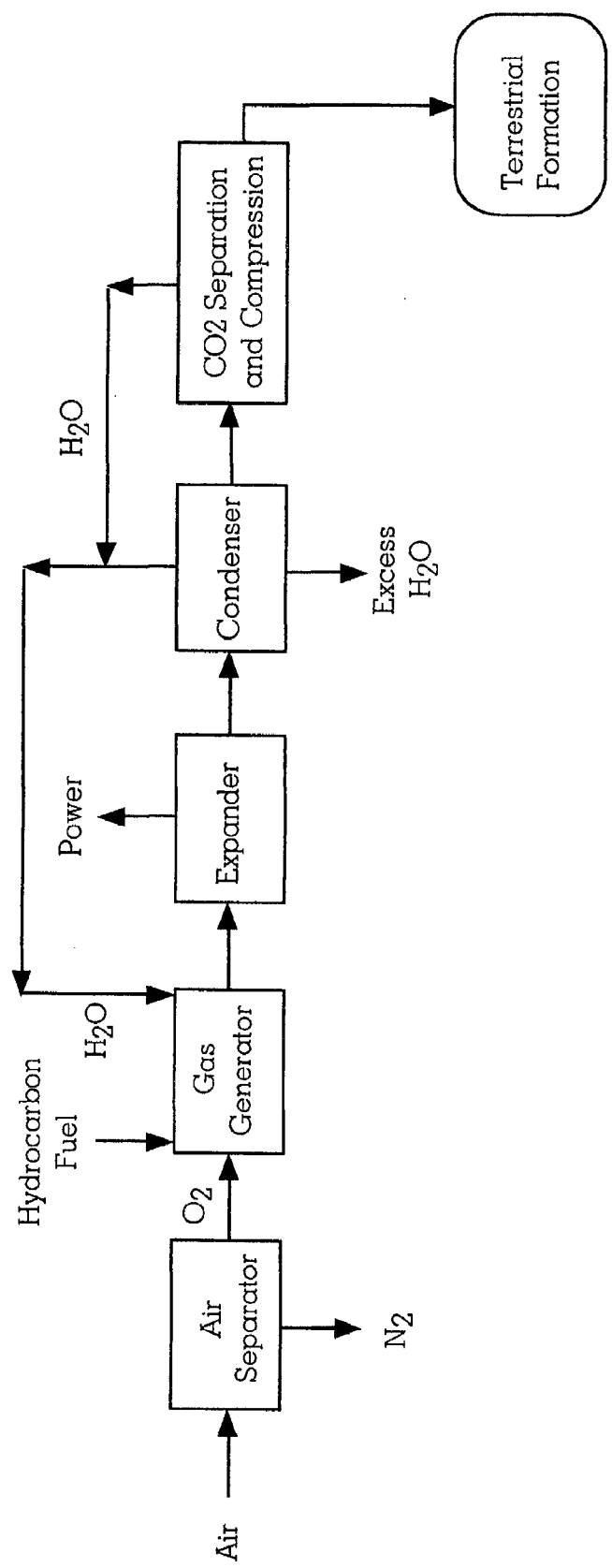
FIG. 18 is a flow chart indicating the basic components of the power generation system of this invention and revealing where materials enter into the system and where materials exit from the system and demonstrating the absence of atmospheric disruption when the power generation system of this invention is in operation.

With particular reference to FIG. 18, a flow chart is provided which identifies the materials which are entered into and discharged from system 1,000. Initially air is drawn into an air separator and nitrogen gas is released from the air separator. Because nitrogen gas already constitutes over three-quarters of air, no pollution of the atmosphere results from this release of nitrogen. Remaining portions of the air are passed into a gas generator along with a hydrocarbon fuel and water where combustion takes place and combustion products are generated. The combustion products are passed through an expander. Power is released from the expander for any desired use. The combustion products are then passed on to a condenser where H2O is released. H2O additionally is not a contaminant of the atmosphere and can be used for a variety of beneficial purposes and recycled for use in the gas generator. Remaining combustion products exit the condenser and are compressed and pumped to pressures necessary for their injection into a terrestrial formation. Once injected into the terrestrial formation the CO2 is isolated from the atmosphere and the potentially detrimental effects of release of large quantities of CO2 into the atmosphere in terms of global warming and other potential negative atmospheric and environmental effects are thwarted.

Moreover, having thus described the invention it should now be apparent that various different modifications could be resorted to without departing from the scope of the invention as disclosed herein and as identified in the included claims. The above description is provided to disclose the best mode for practicing this invention and to enable one skilled in the art to practice this invention but should not be construed to limit the scope of the invention disclosed herein.

What is claimed is:

1. A combustion engine providing clean power for various applications and featuring low NOx production and low CO2 release into the atmosphere, comprising in combination;
   a source of air, the air including nitrogen and oxygen;
   a source of fuel, the fuel including hydrogen and carbon;
   an air separator having an inlet coupled to said source of air, a nitrogen separator, an oxygen enriched air outlet, and a nitrogen outlet separate from said oxygen enriched air outlet, such that at least a portion of the nitrogen is removed from the air entering said inlet;
   a fuel combustor, said fuel combustor receiving fuel from said source of fuel and oxygen enriched air from said outlet of said air separator through an oxygen enriched air inlet adapted to deliver substantially H2O free oxygen enriched air into said fuel combustor, said combustor combusting the fuel with the oxygen enriched air to produce elevated pressure and elevated temperature combustion products including H2O and CO2, said combustor having a discharge for said combustion products;
   a combustion products separator which separates at least a portion of the H2O from other combustion products including CO2 coupled to said discharge and including an H2O outlet and an exhaust for the other combustion products including CO2;
   a compressor coupled to said exhaust, said compressor pressurizing fluids passing there through to a pressure above atmospheric pressure; and
   a terrestrial formation injection system downstream from said compressor, said injection system coupled to said compressor and to a terrestrial formation beneath the atmosphere, said terrestrial formation capable of holding CO2 therein.

2. The combustion engine of claim 1 wherein said combustion products separator includes a condenser, said condenser having a temperature and pressure therein at which H2O condenses into a liquid phase and at which CO2 remains in a gaseous phase.

3. The combustion engine of claim 2 wherein a cooler is oriented between said exhaust of said combustion products separator and said injection system, said cooler having sufficient capability to cool CO2 exiting said combustion products separator at said exhaust to a temperature below a liquefaction temperature for CO2, such that the CO2 is liquefied.

4. The combustion engine of claim 3 wherein said air separator includes means to cool the air from said source of air to a temperature at which oxygen in the air liquefies for separation of the oxygen from the nitrogen, at least a portion of the nitrogen removed from the air directed to said cooler for cooling of the CO2 exiting said exhaust of said combustion products separator.

5. The combustion engine of claim 3 wherein a CO2 pump is located between said cooler and said terrestrial formation injection system, said CO2 pump increasing a pressure of the CO2 exiting the exhaust of the combustion products separator while the CO2 is in a liquid state.

6. The combustion engine of claim 3 wherein a combustion product expansion device is interposed between said discharge of said fuel combustor and said condenser, said combustion product expansion device including means to output power from said engine, said power at least partially used to supply operative power to said air separator and said compressor;

wherein at least a portion of the H2O exiting said condenser through said H2O outlet is routed through a fluid conduit to said fuel combustor where the H2O is combined with said combustion products to decrease a temperature of the combustion products and increase an amount of H2O exiting said discharge of said fuel combustor;

wherein said combustion product expansion device includes three turbines including a high pressure turbine located downstream from said discharge of said fuel combustor and upstream from a reheater, said reheater receiving fuel from said source of fuel and oxygen enriched air from said outlet of said air separator, said reheater combusting the fuel with the oxygen enriched air to produce combustion products including H2O and CO2, said reheater also receiving H2O and CO2 from said high pressure turbine and mixing said H2O and said CO2 from said high pressure turbine with said H2O and said CO2 generated within said reheater; and an intermediate turbine located downstream from said reheater and upstream from a low pressure turbine, a feed water preheater interposed between an intermediate pressure turbine discharge and an inlet to said low pressure turbine, said feed water preheater including means to increase a temperature of the H2O exiting said H2O outlet of said condenser before said H2O is directed back into said fuel combustor.

7. The combustion engine of claim 3 wherein a cooler/condenser is located between said compressor and said cooler, said cooler/condenser including means to condense additional H2O vapor exiting said condenser through said exhaust.

8. The combustion engine of claim 5 wherein said CO2 pump includes means to pressurize the fluids passing there through to a pressure which results in a pressure at said formation of between 10 psia above a pressure of the fluid in said formation and 0.8 psia per foot of depth of said formation.

9. The combustion engine of claim 1 wherein said injection system is configured to deliver the combustion products other than H2O and including CO2 beneath the surface of an ocean.

10. The combustion engine of claim 9 wherein said injection system is configured to deliver the combustion products including CO2 into a porous underground geological formation.

11. The combustion engine of claim 1 wherein said exhaust of said combustion products separator discharges primarily CO2 and said compressor pressurizes the CO2 until the CO2 becomes a super critical fluid.

12. The combustion engine of claim 1 wherein said terrestrial formation injection system is configured to deliver the combustion products including CO2 into an aquifer.

13. A combustion engine providing clean power for various applications and featuring low NOx production and low CO2 release into the atmosphere, comprising in combination:

a source of air, the air including nitrogen and oxygen;
a source of fuel, the fuel including hydrogen and carbon;
an air separator having an inlet coupled to said source of air, a nitrogen separator, an oxygen enriched air outlet, and a nitrogen outlet separate from said oxygen enriched air outlet, such that at least a portion of the nitrogen is removed from the air entering said inlet;
a fuel combustor, said fuel combustor receiving fuel from said source of fuel and oxygen enriched air from said outlet of said air separator through an oxygen enriched air inlet adapted to deliver substantially H2O free oxygen enriched air into said fuel combustor, said combustor combusting the fuel with the oxygen enriched air to produce elevated pressure and elevated temperature combustion products including H2O and CO2, said combustor having a discharge for said combustion products;
a combustion product expansion device coupled to said discharge of said combustion device, said expansion device outputting power from said system and having an exhaust for said combustion products;
a condenser coupled to said exhaust, said condenser having an H2O outlet for liquid H2O and a gaseous combustion product outlet, said condenser configured such that the CO2 remains gaseous and exits said combustor through said gaseous combustion product outlet;
a compressor coupled to said gaseous combustion product outlet, said compressor compressing said gaseous combustion products to above atmospheric pressure; and
a terrestrial formation injection system coupled to said compressor and to a terrestrial formation beneath the atmosphere, said terrestrial formation capable of holding CO2 therein.

14. The system of claim 13 wherein said compressor has sufficient capability to compress gases passing there through to a pressure at which a liquid phase of CO2 can exist.

15. The system of claim 13 wherein a cooler is interposed between said condenser and said terrestrial formation injection system, said cooler having sufficient capability to cool the gaseous combustion products to a temperature at which CO2 transitions into a liquid phase.

16. The system of claim 15 wherein said terrestrial formation injection system includes a liquid CO2 pump, said liquid CO2 pump including means to further pressurize the CO2 passing there through to a pressure corresponding to a pressure existing at a depth within the terrestrial formation into which the terrestrial formation injection system is connected, such that the CO2 can be delivered into the terrestrial formation at the desired depth and without release of the CO2 into the atmosphere.

17. A combustion engine providing clean power for various applications and featuring low NOx production, comprising in combination:

a source of air, the air including nitrogen and oxygen;
a source of fuel, the fuel including hydrogen and carbon;

an air treatment device having an inlet coupled to said source of air, and having an outlet, said air treatment device including means to remove at least a portion of the nitrogen from the air entering said inlet;

a fuel combustion device, said fuel combustion device receiving fuel from said source of fuel and oxygen enriched air from said outlet of said air treatment device through an oxygen enriched air inlet adapted to deliver substantially H2O free oxygen enriched air into said fuel combustion device, said combustion device combusting said fuel with the oxygen enriched air to produce elevated pressure and elevated temperature combustion products including steam, said combustion device having a discharge for said combustion products;

a combustion product expansion device coupled to said discharge of said combustion device, said expansion device outputting power from said engine;

wherein said source of fuel includes fuel having both hydrogen and carbon therein;

wherein said fuel combustion device produces elevated pressure and elevated temperature combustion products including H2O and CO2; and wherein said combustion expansion device includes an exhaust for said combustion products including H2O and CO2, said exhaust upstream from a condenser, said condenser having an H2O outlet for liquid H2O and a gaseous combustion product outlet, said gaseous combustion products being a majority CO2, said condenser configured such that the CO2 remains gaseous and exits said condenser through said gaseous combustion product outlet; whereby CO2 generated by said engine is separated from other combustion products for further storage, handling and disposal of the CO2.

18. The engine of claim 17 wherein said gaseous combustion product outlet of said condenser is coupled to a compressor, said compressor including means to compress the gaseous combustion products including CO2 to a pressure above atmospheric pressure; and a terrestrial formation injection system coupled to said compressor and to a terrestrial formation beneath the atmosphere, said terrestrial formation capable of holding CO2 therein without substantial release of CO2 into the atmosphere.

19. The system of claim 18 wherein said compressor includes means to compress said gaseous combustion products including CO2 to a pressure at which CO2 can exist in a liquid phase;

said compressor having an outlet coupled to a cooler, said cooler including means to cool gaseous combustion products including CO2 exiting said compressor to a temperature below a liquefaction temperature of CO2, such that CO2 within the gaseous combustion products is liquefied; and a CO2 pump including means to pressurize said liquefied CO2 up to a pressure corresponding to a pressure at a depth within said terrestrial formation at which said injection system is configured to inject the CO2.

20. A combustion engine providing clean power for various applications and featuring low NOx production and low CO2 release into the atmosphere, comprising in combination;

a source of air, the air including nitrogen and oxygen;
a source of fuel, the fuel including hydrogen and carbon;
an air separator having an inlet coupled to said source of air, a nitrogen separator, an oxygen enriched air outlet, and a nitrogen outlet separate from said oxygen enriched air outlet, such that at least a portion of the nitrogen is removed from the air entering said inlet;

a fuel combustor, said fuel combustor receiving fuel from said source of fuel and oxygen enriched air from said outlet of said air separator, said combustor combusting the fuel with the oxygen enriched air to produce elevated pressure and elevated temperature combustion products including H2O and CO2, said combustor having a discharge for said combustion products;

a combustion products separator which separates at least a portion of the H2O from other combustion products including CO2, said combustion products separator downstream from said discharge and including an H2O outlet and an exhaust for the other combustion products including CO2, said H2O outlet coupled to an H2O diluent path leading to an H2O inlet into said combustor, said H2O diluent path spaced from an oxygen enriched air inlet into said combustor;

a compressor coupled to said exhaust, said compressor pressurizing fluids passing there through to a pressure above atmospheric pressure; and a terrestrial formation injection system downstream from said compressor, said injection system coupled to said compressor and to a terrestrial formation beneath the atmosphere, said terrestrial formation capable of holding CO2 therein.

21. A combustion engine providing clean power for various applications and featuring low NOx production and low CO2 release into the atmosphere, comprising in combination:

a source of air, the air including nitrogen and oxygen;
a source of fuel, the fuel including hydrogen and carbon;
an air separator having an inlet coupled to said source of air, a nitrogen separator, an oxygen enriched air outlet, and a nitrogen outlet separate from said oxygen enriched air outlet, such that at least a portion of the nitrogen is removed from the air entering said inlet;

a fuel combustor, said fuel combustor receiving fuel from said source of fuel and oxygen enriched air from said outlet of said air separator, said combustor combusting the fuel with the oxygen enriched air to produce elevated pressure and elevated temperature combustion products including H2O and CO2, said combustor having a discharge for said combustion products;

a combustion product expansion device coupled to said discharge of said combustion device, said expansion device outputting power from said system and having an exhaust for said combustion products;

a condenser downstream from said exhaust, said condenser having an H2O outlet for liquid H2O and a gaseous combustion product outlet, said condenser configured such that the CO2 remains gaseous and exits said combustor through said gaseous combustion product outlet, said H2O outlet coupled to an H2O diluent path leading to an H2O inlet into said combustor, said H2O diluent path spaced from an oxygen enriched air inlet into said combustor;

a compressor coupled to said gaseous combustion product outlet, said compressor compressing said gaseous combustion products to above atmospheric pressure; and a terrestrial formation injection system coupled to said compressor and to a terrestrial formation beneath the atmosphere, said terrestrial formation capable of holding CO2 therein.

22. A combustion engine providing clean power for various applications and featuring low NOx production, comprising in combination:

a source of air, the air including nitrogen and oxygen;
a source of fuel, the fuel including hydrogen and carbon;
an air treatment device having an inlet coupled to said source of air, and having an outlet, said air treatment device including means to remove at least a portion of the nitrogen from the air entering said inlet;
a fuel combustion device, said fuel combustion device receiving fuel from said source of fuel and oxygen enriched air from said outlet of said air treatment device, said combustion device combusting said fuel with the oxygen enriched air to produce elevated pressure and elevated temperature combustion products including steam, said combustion device having a discharge for said combustion products;
a combustion product expansion device coupled to said discharge of said combustion device, said expansion device outputting power from said engine;
wherein said source of fuel includes fuel having both hydrogen and carbon therein;
wherein said fuel combustion device produces elevated pressure and elevated temperature combustion products including $H_2O$ and $CO_2$; and
wherein said expansion device includes an exhaust for said combustion products including $H_2O$ and $CO_2$, said exhaust upstream from a condenser, said condenser having an $H_2O$ outlet for liquid $H_2O$ and a gaseous combustion product outlet, said $H_2O$ outlet coupled to an $H_2O$ diluent path leading to an $H_2O$ inlet into said combustion device, said $H_2O$ diluent path spaced from an oxygen enriched air inlet into said combustion device, said gaseous combustion products being a majority $CO_2$, said condenser configured such that the $CO_2$ remains gaseous and exits said condenser through said gaseous combustion product outlet; whereby $CO_2$ generated by said engine is separated from other combustion products for further storage, handling and disposal of the $CO_2$.

23. A combustion engine providing clean power for various applications and featuring low NOx production and low $CO_2$ release into the atmosphere, comprising in combination:
a source of air, the air including nitrogen and oxygen;
a source of fuel, the fuel including hydrogen and carbon;
an air separator having an inlet coupled to said source of air, a nitrogen separator, an oxygen enriched air outlet, and a nitrogen outlet separate from said oxygen enriched air outlet, such that at least a portion of the nitrogen is removed from the air entering said inlet;
a fuel combustor, said fuel combustor receiving fuel from said source of fuel and oxygen enriched air from said oxygen enriched air outlet of said air separator through an oxygen enriched air inlet adapted to deliver substantially $H_2O$ free oxygen enriched air into said fuel combustor, said combustor combusting the fuel with the oxygen enriched air to produce elevated pressure and elevated temperature combustion products including $H_2O$ and $CO_2$, said combustor having a discharge for said combustion products;
a combustion product expansion device located downstream from said discharge of said combustion device, said expansion device outputting power from said system and having an exhaust for said combustion products;
a combustion products separator downstream from said exhaust, said separator having a first outlet for combustion products including $H_2O$ and a second gaseous combustion product outlet, said combustion products separator configured such that at least a portion of the $CO_2$ remains gaseous and at least a portion of the $CO_2$ exits said combustor through said second gaseous combustion product outlet;
said first outlet containing a stream of combustion products from said separator having a greater percentage of $H_2O$ than a percentage of $H_2O$ in the combustion products entering said separator, such that the stream of combustion products passing through said first outlet is $H_2O$ enriched;
a compressor located downstream from said gaseous combustion product outlet, said compressor compressing said gaseous combustion products to above atmospheric pressure; and
a terrestrial formation injection system located downstream from said compressor and upstream from a terrestrial formation beneath the atmosphere, said terrestrial formation capable of holding $CO_2$ therein.

24. The system of claim 23 wherein said first outlet recirculates back into said system upstream of said expansion device.

25. The system of claim 24 wherein said first outlet recirculates at least a portion of the combustion products including $H_2O$ into said combustor.

26. The system of claim 23 wherein said compressor has sufficient capability to compress gases passing there through to a pressure at which a liquid phase of $CO_2$ can exist; and
wherein said terrestrial formation injection system includes a liquid $CO_2$ pump, said liquid $CO_2$ pump including means to further pressurize the $CO_2$ passing there through to a pressure corresponding to a fluid pressure existing at a depth within the terrestrial formation into which the terrestrial formation injection system is connected, such that the $CO_2$ can be delivered into the terrestrial formation at the desired depth and without release of the $CO_2$ into the atmosphere.

27. A combustion engine providing clean power for various applications and featuring low NOx production and low $CO_2$ release into the Earth's atmosphere, comprising in combination:
a source of air, the air including nitrogen and oxygen;
a source of fuel, the fuel including hydrogen and carbon;
an air treatment device having an inlet coupled to said source of air, and having an outlet, said air treatment device including a nitrogen separator, such that at least a portion of the nitrogen is removed from the air entering said inlet;
a fuel combustor, said fuel combustor receiving fuel from said source of fuel and $O_2$ enriched air from said outlet of said air treatment device through an oxygen enriched air inlet adapted to deliver substantially $H_2O$ free oxygen enriched air into said fuel combustor, said combustor combusting said fuel with the oxygen enriched air to produce elevated pressure and elevated temperature combustion products including steam and carbon dioxide, said combustor having a discharge for said combustion products;
a combustion product expander located downstream from said discharge of said combustor, said expander outputting power from said engine and having an exhaust for said combustion products;
wherein said fuel combustor produces elevated pressure and elevated temperature combustion products including $H_2O$ and $CO_2$;
a combustion products separator located downstream of said combustor exhaust, said separator including an $H_2O$ outlet for an $H_2O$ enriched stream of the combustion products and a CO2 outlet for a CO2 enriched stream of the combustion products;

wherein said CO2 rich combustion product outlet of said separator is located upstream from a compressor, said compressor compressing the gaseous combustion products including CO2 to a pressure above atmospheric pressure; and a terrestrial formation injection system located downstream from said compressor and upstream from a terrestrial formation beneath the atmosphere, said terrestrial formation capable of holding CO2 therein without substantial release of CO2 into the atmosphere.

28. The engine of claim 27 wherein said separator receives all of said combustion products exiting said exhaust.

29. The engine of claim 27 wherein said expander exhaust is located upstream from a condenser, said condenser having an H2O outlet for liquid H2O and a gaseous combustion product outlet, said gaseous combustion products being a majority CO2, said condenser configured such that the CO2 remains gaseous and exits said condenser through said gaseous combustion product outlet; whereby CO2 generated by said engine is separated from other combustion products for further storage, handling and disposal of the CO2.

30. The engine of claim 27 wherein said nitrogen separator of said air treatment device includes a means to remove at least a portion of the nitrogen from the air entering said inlet of said air treatment device.

31. The engine of claim 27 wherein said H2O outlet is coupled to a fluid conduit directing at least a portion of the H2O rich stream of combustion products passing through said H2O outlet back into said engine upstream of said combustion product expander.

32. The engine of claim 27 wherein at least a portion of the CO2 enriched combustion products exiting said CO2 outlet are routed to a condenser, said condenser condensing at least a portion of H2O remaining within the CO2 enriched combustion products entering said condenser, said condensed H2O exiting said condenser and routed back into said system upstream from said combustion product expansion device.

33. The engine of claim 27 wherein said fuel combustor includes an H2O inlet coupled to a pressurized source of H2O said H2O inlet delivery H2O into said combustor to control a temperature of the combustion products in said combustor and exiting said combustor.

34. A combustion device producing carbon dioxide for various applications and featuring low NOx production and low CO2 release into the atmosphere, comprising in combination:

a source of air, the air including nitrogen and oxygen;
a source of fuel, the fuel including hydrogen and carbon;
an air separator having an inlet coupled to said source of air, a nitrogen separator, an oxygen enriched air outlet, and a nitrogen outlet separate from said oxygen enriched air outlet, such that at least a portion of the nitrogen is removed from the air entering said inlet;

a fuel combustor, said fuel combustor receiving fuel from said source of fuel and oxygen enriched air from said outlet of said air separator through an oxygen enriched air inlet adapted to deliver substantially H2O free oxygen enriched air into said fuel combustor, said combustor combusting the fuel with the oxygen enriched air to produce elevated pressure and elevated temperature combustion products including H2O and CO2, said combustor having a discharge for said combustion products;

a combustion products separator downstream from said combustor device which separates at least a portion of the H2O from other combustion products including CO2 downstream from said discharge and including an H2O outlet for an H2O rich stream of the combustion products and an exhaust for the other combustion products including CO2;

a compressor downstream from said exhaust, said compressor pressurizing fluids passing there through to a pressure above atmospheric pressure; and a terrestrial formation injection system downstream from said compressor, said injection system leading to a terrestrial formation beneath the atmosphere, said terrestrial formation capable of holding CO2 therein.

35. The combustion device of claim 34 wherein at least a portion of the H2O exiting said combustion products separator through said H2O outlet is routed through a fluid conduit to said fuel combustor where the H2O is combined with said combustion products to decrease a temperature of the combustion products and increase an amount of H2O exiting said discharge of said fuel combustor.

36. The combustion device of claim 34 wherein said combustion products separator includes a condenser, said condenser having a temperature and pressure therein at which at least a portion of the H2O in the combustion products condenses into a liquid phase and at which at least a portion of the CO2 in the combustion products remains in a gaseous phase.

37. The combustion device of claim 34 wherein a mass fraction of H2O in the said H2O rich stream of the combustion products is greater than a mass fraction of other components in said H2O rich stream of the combustion products.

38. The combustion device of claim 34 wherein the terrestrial formation is a subterranean formation which contains at least some hydrocarbons therein, the subterranean formation being penetrated by one or more wells, an injection system capable of injecting combustion products including CO2 into the hydrocarbon containing formation such that recovery of hydrocarbons from the hydrocarbon containing formation is enhanced.

39. The combustion device of claim 34 wherein a CO2 pump is located downstream from said compressor and upstream of said terrestrial formation injection system, said CO2 pump increasing a pressure of the CO2 exiting the exhaust of the combustion products separator while the CO2 is at least partially in a liquid state.

40. The combustion device of claim 39 wherein said CO2 pump includes means to pressurize the fluids passing there through to a pressure which results in a pressure of between 10 psi above the pressure of the fluid in said formation and a pressure less than 0.8 psi per foot of depth of said formation.

41. The combustion device of claim 34 wherein a combustion product expansion device is interposed between said discharge of said fuel combustor and said separator, said combustion product expansion device including means to output power from said engine.

42. The combustion device of claim 41 wherein said output power is at least partially used to supply operative power to said air separator.

43. The combustion device of claim 41 wherein said combustion product expansion device includes at least two turbines including a high pressure turbine located downstream from said discharge of said fuel combustor and upstream from a reheater, said reheater receiving fuel from said source of fuel and oxygen enriched air from said outlet of said air separator, said reheater combusting the fuel with the oxygen enriched air to produce combustion products including H2O and CO2, said reheater also receiving H2O and CO2 from said high pressure turbine and mixing at least a portion of said H2O and said CO2 from said high pressure turbine with at least a portion of said H2O and said CO2 generated within said reheater.

44. The combustion device of claim 34 wherein said injection system is configured to deliver at least a portion of the combustion products including CO2 into a terrestrial formation taken from the group of terrestrial formations including: beneath the surface of an ocean, into an aquifer, into a hydrocarbon containing formation and into a porous underground geological formation.

45. The combustion device of claim 34 wherein said exhaust of said combustion products separator discharges primarily CO2 and said compressor pressurizes the CO2 until the CO2 becomes a super critical fluid.

46. A combustion engine providing clean power for various applications and featuring low NOx production and low CO2 release into the atmosphere, comprising in combination:
   a source of air, the air including nitrogen and oxygen;
   a source of fuel, the fuel including hydrogen and carbon;
   an air separator having an inlet coupled to said source of air, a nitrogen separator, an oxygen enriched air outlet, and a nitrogen outlet separate from said oxygen enriched air outlet, such that at least a portion of the nitrogen is removed from the air entering said inlet;
   a fuel combustor, said fuel combustor receiving fuel from said source of fuel and oxygen enriched air from said oxygen enriched air outlet of said air separator, said combustor combusting the fuel with the oxygen enriched air to produce elevated pressure and elevated temperature combustion products including H2O and CO2, said combustor having a discharge for said combustion products;
   a combustion product expansion device located downstream from said discharge of said combustion device, said expansion device outputting power from said system and having an exhaust for said combustion products;
   a combustion products separator downstream from said exhaust, said separator having a first outlet for combustion products including H2O and a second gaseous combustion product outlet, said first outlet coupled to an H2O diluent path leading to an H2O inlet into said combustor, said H2O diluent path spaced from an oxygen enriched air inlet into said combustor, said combustion products separator configured such that at least a portion of the CO2 remains gaseous and at least a portion of the CO2 exits said combustor through said second gaseous combustion product outlet;
   said first outlet containing a stream of combustion products from said separator having a greater percentage of H2O than a percentage of H2O in the combustion products entering said separator, such that the stream of combustion products passing through said first outlet is H2O enriched;
   a compressor located downstream from said gaseous combustion product outlet, said compressor compressing said gaseous combustion products to above atmospheric pressure; and
   a terrestrial formation injection system located downstream from said compressor and upstream from a terrestrial formation beneath the atmosphere, said terrestrial formation capable of holding CO2 therein.

47. A combustion engine providing clean power for various applications and featuring low NOx production and low CO2 release into the Earth's atmosphere, comprising in combination:
   a source of air, the air including nitrogen and oxygen;
   a source of fuel, the fuel including hydrogen and carbon;
   an air treatment device having an inlet coupled to said source of air, and having an outlet, said air treatment device including a nitrogen separator, such that at least a portion of the nitrogen is removed from the air entering said inlet;
   a fuel combustor, said fuel combustor receiving fuel from said source of fuel and oxygen enriched air from said outlet of said air treatment device, said combustor combusting said fuel with the oxygen enriched air to produce elevated pressure and elevated temperature combustion products including steam and carbon dioxide, said combustor having a discharge for said combustion products;
   a combustion product expander located downstream from said discharge of said combustor, said expander outputting power from said engine and having an exhaust for said combustion products;
   wherein said fuel combustor produces elevated pressure and elevated temperature combustion products including H2O and CO2;
   a combustion products separator located downstream of said combustor exhaust, said separator including an H2O outlet for an H2O enriched stream of the combustion products and a CO2 outlet for a CO2 enriched stream of the combustion products, said H2O outlet coupled to an H2O diluent path leading to an H2O inlet into said combustor, said H2O diluent path spaced from an oxygen enriched air inlet into said combustor;
   wherein said CO2 rich combustion product outlet of said separator is located upstream from a compressor, said compressor compressing the gaseous combustion products including CO2 to a pressure above atmospheric pressure; and
   a terrestrial formation injection system located downstream from said compressor and upstream from a terrestrial formation beneath the atmosphere, said terrestrial formation capable of holding CO2 therein without substantial release of CO2 into the atmosphere.

48. A combustion device producing carbon dioxide for various applications and featuring low NOx production and low CO2 release into the atmosphere, comprising in combination:
   a source of air, the air including nitrogen and oxygen;
   a source of fuel, the fuel including hydrogen and carbon;
   an air separator having an inlet coupled to said source of air, a nitrogen separator, an oxygen enriched air outlet, and a nitrogen outlet separate from said oxygen enriched air outlet, such that at least a portion of the nitrogen is removed from the air entering said inlet;
   a fuel combustor, said fuel combustor receiving fuel from said source of fuel and oxygen enriched air from said outlet of said air separator, said combustor combusting the fuel with the oxygen enriched air to produce elevated pressure and elevated temperature combustion products including H2O and CO2, said combustor having a discharge for said combustion products;
   a combustion products separator downstream from said combustor device which separates at least a portion of the H2O from other combustion products including CO2 downstream from said discharge and including an H2O outlet for an H2O rich stream of the combustion products and an exhaust for the other combustion products including CO2, said H2O outlet coupled to an H2O diluent path leading to an H2O inlet into said combustor, said H2O diluent path spaced from an oxygen enriched air inlet into said combustor;

a compressor downstream from said exhaust, said compressor pressurizing fluids passing there through to a pressure above atmospheric pressure; and a terrestrial formation injection system downstream from said compressor, said injection system leading to a terrestrial formation beneath the atmosphere, said terrestrial formation capable of holding CO2 therein.

49. A combustion engine providing clean power for various applications and featuring low NOx production and low CO2 release into the atmosphere, comprising in combination:

a source of air, the air including nitrogen and oxygen;

a source of fuel, the fuel including hydrogen and carbon;

an air separator having an inlet coupled to said source of air, a means to separate at least a portion of the nitrogen from the oxygen, an oxygen enriched air outlet, and a nitrogen outlet separate from said oxygen enriched air outlet;

a fuel combustor, said fuel combustor receiving fuel from said source of fuel and oxygen enriched air from said oxygen enriched air outlet of said air separator through an oxygen enriched air inlet adapted to deliver substantially H2O free oxygen enriched air into said fuel combustor, said combustor combusting at least a portion of the fuel with at least a portion of the oxygen enriched air to produce elevated pressure and elevated temperature combustion products including H2O and CO2, said combustor having a discharge for said combustion products;

a combustion product expansion device located downstream from said discharge of said combustion device and having an exhaust for said combustion products;

a reheater downstream from said exhaust of said combustion product expansion device, said reheater elevating a temperature of said combustion products entering said reheater;

a combustion products separator downstream from said fuel combustor, said separator having a first outlet for combustion products including H2O and a second combustion product outlet for at least a portion of the CO2;

a compressor located downstream from said second combustion product outlet, said compressor compressing said combustion products to above atmospheric pressure; and a terrestrial formation injection system located downstream from said compressor and upstream from a terrestrial formation beneath the atmosphere, said terrestrial formation capable of holding CO2 therein.

50. The combustion engine of claim 49 wherein said combustion products separator is located downstream from said reheater.

51. The combustion engine of claim 49 wherein said reheater includes a combustion product inlet downstream from said exhaust of said combustion product expansion device and a fuel inlet, said reheater adapted to combust said fuel to elevate the temperature of the combustion products within said reheater.

52. The combustion engine of claim 49 wherein said reheater includes a combustion products inlet downstream from said exhaust of said combustion product expansion device and an oxygen enriched air inlet downstream from said oxygen enriched air outlet of said air separator, the reheater adapted to combust at least a portion of the oxygen in the oxygen enriched air within the reheater to elevate the temperature of the combustion products.

53. The combustion engine of claim 52 wherein said reheater includes a fuel inlet downstream from said source of fuel, said reheater adapted to combust at least a portion of the fuel from said source of fuel with at least a portion of the oxygen from said oxygen enriched air outlet of said air separator to both produce additional elevated pressure and elevated temperature combustion products including H2O and CO2 and elevate a temperature of said combustion products entering said reheater from said exhaust of said combustion product expansion device.

54. The combustion engine of claim 53 wherein said fuel inlet and said oxygen enriched air inlet of said reheater bring the fuel and the oxygen enriched air into direct contact with said combustion products entering said reheater from said exhaust of said combustion product expansion device.

55. The combustion engine of claim 54 wherein said reheater includes an outlet for a mixture of combustion products formed within said reheater and combustion products entering said reheater through said combustion product inlet.

56. The combustion engine of claim 49 wherein a second combustion product expansion device is located downstream from an outlet for combustion products exiting said reheater.

57. The combustion engine of claim 56 wherein at least one of said expansion devices is adapted to output power from said system.

58. The combustion engine of claim 49 wherein the terrestrial formation is a subterranean formation which contains at least some hydrocarbons therein, the subterranean formation being penetrated by one or more wells, an injection system capable of injecting combustion products including CO2 into the hydrocarbon containing formation, such that recovery of hydrocarbons from the hydrocarbon containing formation is enhanced.

59. A combustion engine providing clean power for various applications and featuring low NOx production and low CO2 release into the atmosphere, comprising in combination:

a source of air, the air including nitrogen and oxygen;

a source of fuel, the fuel including hydrogen and carbon;

an air separator having an inlet coupled to said source of air, a means to separate at least a portion of the nitrogen from the oxygen, an oxygen enriched air outlet, and a nitrogen outlet separate from said oxygen enriched air outlet;

a combustor, said combustor including a fuel inlet downstream from said fuel source, an oxygen inlet adapted to deliver substantially H2O free oxygen into said combustor downstream from said oxygen enriched air outlet of said air separator, and a discharge for a first working fluid including products of combustion of the fuel from said fuel source with the oxygen from said air separator, said first working fluid including H2O and CO2;

a first expander located downstream from said combustor, said first expander having an outlet for said first working fluid; and a reheater located downstream from said first expander, said reheater elevating a temperature of the first working fluid entering said reheater.

60. The combustion engine of claim 59 wherein said reheater includes a fuel inlet coupled to a source of fuel including carbon and hydrogen, an oxygen inlet coupled to a source of oxidizer, the oxidizer having more oxygen than is present in air, a first working fluid inlet downstream from said first expander outlet and a reheater discharge for a second working fluid comprised of the first working fluid from said outlet of said first expander and products of combustion of the fuel from said fuel source and the oxidizer.

61. The combustion engine of claim 59 wherein said first expander is adapted to output power from said combustion engine.

62. The combustion engine of claim 59 wherein a second expander is located downstream from said reheater, at least one of said expanders adapted to output power from said combustion engine.

63. The combustion engine of claim 59 wherein said combustor includes a water inlet coupled to a source of water, said water inlet spaced from said oxygen inlet and adapted to direct water into said combustor.

64. The combustion engine of claim 63 wherein at least a portion of said water at said source of water includes water exiting downstream from said reheater as a component of products of combustion generated within said combustion engine.

65. The combustion engine of claim 59 wherein a separator is located downstream from said reheater, said separator separating at least a portion of the water in said working fluid from a portion of the carbon dioxide in said working fluid.

66. The combustion engine of claim 65 wherein said separator includes a CO2 outlet for a portion of said working fluid having a greater concentration of CO2 than the concentration of CO2 within the working fluid;
   a compressor downstream of said separator outlet, said compressor compressing fluids therein to above atmospheric pressure; and
   a terrestrial formation injector located downstream from said compressor and upstream from a terrestrial formation beneath the atmosphere, said terrestrial formation capable of holding CO2 therein.

67. A hydrocarbon combustion power generation system, comprising in combination:
   a source of air, the air including nitrogen and oxygen;
   a source of fuel, the fuel including hydrogen and carbon;
   an air separator having an inlet coupled to said source of air, a means to separate at least a portion of the nitrogen from the oxygen, an oxygen enriched air outlet, and a nitrogen outlet separate from said oxygen enriched air outlet;
   a combustor downstream of said source of fuel and said oxygen enriched air outlet of said air separator through an oxygen enriched air inlet adapted to deliver substantially H2O free oxygen enriched air into said combustor, said combustor combusting the fuel with the oxygen enriched air to produce elevated pressure and elevated temperature combustion products including H2O and CO2, said combustor having a discharge for said combustion products;
   a first combustion products expander located downstream from said discharge of said combustor;
   a reheater downstream from said first combustion products expander;
   a second combustion products expander located downstream from said reheater; and
   at least one of said expanders adapted to output power from said power generation system.

68. The power generation system of claim 67 wherein a separator is located downstream from said reheater, said separator including a CO2 outlet for collecting CO2 generated within the power generation system.

69. The power generation system of claim 68 wherein a compressor is located downstream from said CO2 outlet of said separator, said compressor compressing the CO2 to above atmospheric pressure, said compressor upstream from a terrestrial formation beneath the atmosphere, said terrestrial formation capable of holding CO2 therein.

70. The power generation system of claim 69 wherein power to drive said compressor is at least partially provided by power outputted from at least one of said combustion product expanders.

71. The power generation system of claim 67 wherein at least a portion of the water in said combustion products is produced within said combustor and is recirculated along a water diluent path leading to a water inlet adapted to direct water into said combustor, said water diluent path spaced from said oxygen enriched air inlet into said combustor.

72. A combustion engine providing clean power for various applications and featuring low NOx production and low CO2 release into the atmosphere, comprising in combination:
   a source of air, the air including nitrogen and oxygen;
   a source of fuel, the fuel including hydrogen and carbon;
   an air separator having an inlet coupled to said source of air, a means to separate at least a portion of the nitrogen from the oxygen, an oxygen enriched air outlet, and a nitrogen outlet separate from said oxygen enriched air outlet;
   a fuel combustor, said fuel combustor receiving fuel from said source of fuel and oxygen enriched air from said oxygen enriched air outlet of said air separator, said combustor combusting at least a portion of the fuel with at least a portion of the oxygen enriched air to produce elevated pressure and elevated temperature combustion products including H2O and CO2, said combustor having a discharge for said combustion products;
   a combustion product expansion device located downstream from said discharge of said combustion device and having an exhaust for said combustion products;
   a reheater downstream from said exhaust of said combustion product expansion device, said reheater elevating a temperature of said combustion products entering said reheater;
   a combustion products separator downstream from said fuel combustor, said separator having a first outlet for combustion products including H2O and a second combustion product outlet for at least a portion of the CO2, said first outlet coupled to an H2O diluent path leading to an H2O inlet into said combustor, said H2O diluent path spaced from an oxygen enriched air inlet into said combustor;
   a compressor located downstream from said second combustion product outlet, said compressor compressing said combustion products to above atmospheric pressure; and
   a terrestrial formation injection system located downstream from said compressor and upstream from a terrestrial formation beneath the atmosphere, said terrestrial formation capable of holding CO2 therein.

* * * * *